US011055160B2

(12) United States Patent
Stankevichus

(10) Patent No.: US 11,055,160 B2
(45) Date of Patent: Jul. 6, 2021

(54) METHOD OF DETERMINING POTENTIAL ANOMALY OF MEMORY DEVICE

(71) Applicant: YANDEX EUROPE AG, Lucerne (CH)

(72) Inventor: Aleksey Alekseevich Stankevichus, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 121 days.

(21) Appl. No.: 16/367,537

(22) Filed: Mar. 28, 2019

(65) Prior Publication Data

US 2020/0089558 A1 Mar. 19, 2020

(30) Foreign Application Priority Data

Sep. 14, 2018 (RU) .......................... RU2018132711

(51) Int. Cl.
| | | |
|---|---|---|
| G06F 11/00 | (2006.01) | |
| G06F 11/07 | (2006.01) | |
| G06F 11/34 | (2006.01) | |

(52) U.S. Cl.
CPC ...... *G06F 11/0727* (2013.01); *G06F 11/3419* (2013.01); *G06F 11/3428* (2013.01);
(Continued)

(58) Field of Classification Search
CPC ............... G11C 16/349; G06F 11/0727; G06F 11/0754; G06F 11/076; G06F 11/3419; G06F 11/3452; G06F 11/3428
See application file for complete search history.

(56) References Cited

U.S. PATENT DOCUMENTS

| 5,247,677 A | 9/1993 | Welland et al. |
|---|---|---|
| 5,278,984 A | 1/1994 | Batchelor |
| (Continued) | | |

FOREIGN PATENT DOCUMENTS

| CN | 105653365 A | 6/2016 |
|---|---|---|
| CN | 103514037 B | 6/2018 |
| (Continued) | | |

OTHER PUBLICATIONS

Ruemmler et al., "An Introduction to Disk Drive Modeling", Hewlett Packard Laboratories, IEEE, Mar. 1994, pp. 17-29 (Year: 1994).*

(Continued)

*Primary Examiner* — Michael Maskulinski
(74) *Attorney, Agent, or Firm* — BCF LLP

(57) ABSTRACT

A method of determining a potential malfunction of a memory device is executable at a supervisory entity computer communicatively coupled to the memory device. The method includes, over a pre-determined period of time, determining a subset of input/output (I/O) operations having been sent to the memory device for processing, applying at least one counter to determine an actual activity time of the memory device during the pre-determined period of time, applying a pre-determined model to generate an estimate of a benchmark processing time for each one of the subset of transactions, calculating a benchmark processing time for the subset of I/O operations, generating a performance parameter based on the actual activity time and the benchmark processing time, and based on an analysis of the performance parameter, determining if the potential malfunction is present in the memory device.

33 Claims, 13 Drawing Sheets

(52) U.S. Cl.
CPC ...... *G06F 11/3452* (2013.01); *G06F 2201/81* (2013.01); *G06F 2201/88* (2013.01)

(56) References Cited

U.S. PATENT DOCUMENTS

| | | | |
|---|---|---|---|
| 5,577,202 | A | 11/1996 | Padgett |
| 5,640,563 | A | 6/1997 | Carmon |
| 5,845,316 | A | 12/1998 | Hillyer et al. |
| 6,023,720 | A | 2/2000 | Aref et al. |
| 6,256,755 | B1 * | 7/2001 | Hook ................ G11C 16/349 365/200 |
| 6,553,472 | B2 * | 4/2003 | Yang ................ G06F 13/1689 365/194 |
| 6,757,897 | B1 | 6/2004 | Shi et al. |
| 6,791,992 | B1 | 9/2004 | Yun et al. |
| 6,851,115 | B1 | 2/2005 | Cheyer et al. |
| 6,859,931 | B1 | 2/2005 | Cheyer et al. |
| 7,073,021 | B2 | 7/2006 | Iren et al. |
| 7,177,866 | B2 | 2/2007 | Holenstein et al. |
| 7,474,989 | B1 | 1/2009 | Wilcoxon |
| 7,562,362 | B1 | 7/2009 | Paquette et al. |
| 7,971,093 | B1 * | 6/2011 | Goel ................ G06F 11/3485 714/6.22 |
| 8,037,024 | B1 | 10/2011 | Bozkaya et al. |
| 8,117,621 | B2 | 2/2012 | Singh et al. |
| 8,145,838 | B1 | 3/2012 | Miller et al. |
| 8,254,172 | B1 * | 8/2012 | Kan ................ G11C 16/06 365/185.12 |
| 8,595,302 | B2 | 11/2013 | Krishnamurthi et al. |
| 8,799,913 | B2 | 8/2014 | Yoo et al. |
| 8,826,301 | B2 | 9/2014 | Kim et al. |
| 8,838,539 | B1 | 9/2014 | Ashcraft et al. |
| 8,850,018 | B2 | 9/2014 | Massa et al. |
| 8,850,446 | B2 | 9/2014 | Avni et al. |
| 8,930,954 | B2 | 1/2015 | Hildrum et al. |
| 8,966,490 | B2 | 2/2015 | Avni et al. |
| 9,037,826 | B1 * | 5/2015 | Brooker ................ H04L 43/08 711/167 |
| 9,047,331 | B2 | 6/2015 | Rao et al. |
| 9,093,160 | B1 * | 7/2015 | Ellis ................ G11C 7/22 |
| 9,203,900 | B2 | 12/2015 | Rao et al. |
| 9,251,195 | B2 | 2/2016 | Yamada |
| 9,304,694 | B2 | 4/2016 | Colgrove et al. |
| 9,348,592 | B2 | 5/2016 | Jha |
| 9,354,813 | B1 | 5/2016 | Dolan et al. |
| 9,400,682 | B2 | 7/2016 | Persikov et al. |
| 9,477,521 | B2 | 10/2016 | Truong et al. |
| 9,489,443 | B1 | 11/2016 | Muniswamy-Reddy et al. |
| 9,547,528 | B1 | 1/2017 | McClure et al. |
| 9,569,339 | B1 | 2/2017 | Villalobos et al. |
| 9,639,396 | B2 | 5/2017 | Pho et al. |
| 9,699,017 | B1 | 7/2017 | Gupta et al. |
| 9,811,391 | B1 | 11/2017 | Barrett |
| 9,921,557 | B2 | 3/2018 | Slupik et al. |
| 10,552,215 | B1 | 2/2020 | Xu et al. |
| 10,572,323 | B1 * | 2/2020 | Zhai ................ G06F 11/3034 |
| 2002/0099756 | A1 | 7/2002 | Catthoor et al. |
| 2003/0115410 | A1 * | 6/2003 | Shriver ................ G06F 3/0643 711/113 |
| 2004/0213387 | A1 | 10/2004 | Chandrasekaran |
| 2005/0047425 | A1 | 3/2005 | Liu et al. |
| 2007/0002750 | A1 | 1/2007 | Sang et al. |
| 2007/0226332 | A1 | 9/2007 | Becker-Szendy et al. |
| 2007/0268516 | A1 | 11/2007 | Bugwadia et al. |
| 2007/0282660 | A1 | 12/2007 | Forth et al. |
| 2008/0049633 | A1 | 2/2008 | Edwards et al. |
| 2008/0168452 | A1 | 7/2008 | Molaro et al. |
| 2008/0320482 | A1 | 12/2008 | Dawson et al. |
| 2009/0013154 | A1 | 1/2009 | Du et al. |
| 2009/0292744 | A1 | 11/2009 | Matsumura |
| 2009/0300449 | A1 | 12/2009 | Qian et al. |
| 2010/0011182 | A1 | 1/2010 | Le Moal et al. |
| 2010/0035581 | A1 | 2/2010 | Park et al. |
| 2010/0185847 | A1 | 7/2010 | Shasha et al. |
| 2011/0145830 | A1 | 6/2011 | Yamaguchi |
| 2011/0153566 | A1 | 6/2011 | Larson et al. |
| 2011/0196834 | A1 | 8/2011 | Kesselman et al. |
| 2011/0219100 | A1 | 9/2011 | Dhuse et al. |
| 2011/0261698 | A1 | 10/2011 | Kamerkar et al. |
| 2011/0314070 | A1 | 12/2011 | Brown et al. |
| 2012/0046807 | A1 | 2/2012 | Ruther et al. |
| 2012/0047317 | A1 | 2/2012 | Yoon et al. |
| 2012/0066449 | A1 | 3/2012 | Colgrove et al. |
| 2012/0124273 | A1 * | 5/2012 | Goss ................ G11C 16/349 711/103 |
| 2012/0204265 | A1 | 8/2012 | Judge |
| 2012/0278801 | A1 | 11/2012 | Nelson et al. |
| 2013/0042156 | A1 | 2/2013 | Srinivasan et al. |
| 2013/0132057 | A1 * | 5/2013 | Deng ................ G06F 3/0659 703/21 |
| 2013/0191836 | A1 | 7/2013 | Meyer |
| 2013/0227186 | A1 | 8/2013 | Laughton |
| 2013/0326161 | A1 * | 12/2013 | Cohen ................ G06F 3/0679 711/154 |
| 2014/0019987 | A1 | 1/2014 | Verma et al. |
| 2014/0074623 | A1 | 3/2014 | Mohammadi et al. |
| 2014/0157276 | A1 | 6/2014 | Smithson et al. |
| 2014/0208327 | A1 | 7/2014 | Cadambi et al. |
| 2014/0226565 | A1 | 8/2014 | Velev et al. |
| 2014/0250438 | A1 | 9/2014 | Shin et al. |
| 2014/0282572 | A1 | 9/2014 | Kang |
| 2014/0304601 | A1 | 10/2014 | Rossano et al. |
| 2015/0127625 | A1 | 5/2015 | Bulkowski et al. |
| 2015/0128149 | A1 | 5/2015 | Meijer et al. |
| 2015/0237157 | A1 | 8/2015 | Wang et al. |
| 2015/0347185 | A1 | 12/2015 | Holt et al. |
| 2015/0347211 | A1 | 12/2015 | Dang et al. |
| 2015/0347554 | A1 | 12/2015 | Vasantham et al. |
| 2016/0149964 | A1 | 5/2016 | Pastro |
| 2016/0188376 | A1 | 6/2016 | Rosas et al. |
| 2016/0266934 | A1 | 9/2016 | Rimoni |
| 2016/0291885 | A1 | 10/2016 | Pendharkar et al. |
| 2017/0017676 | A1 | 1/2017 | Levy et al. |
| 2017/0031713 | A1 | 2/2017 | Campbell et al. |
| 2017/0048021 | A1 | 2/2017 | Yanovsky et al. |
| 2017/0109203 | A1 | 4/2017 | Liu et al. |
| 2017/0147488 | A1 | 5/2017 | Vaquero |
| 2017/0177697 | A1 | 6/2017 | Lee et al. |
| 2017/0308403 | A1 | 10/2017 | Turull et al. |
| 2017/0374516 | A1 | 12/2017 | Huo et al. |
| 2018/0006999 | A1 | 1/2018 | Doukhvalov et al. |
| 2018/0041477 | A1 | 2/2018 | Shaposhnik |
| 2018/0052710 | A1 | 2/2018 | Choi et al. |
| 2018/0101448 | A1 | 4/2018 | Ventura et al. |
| 2018/0114290 | A1 | 4/2018 | Paltashev et al. |
| 2018/0157543 | A1 | 6/2018 | Bellomo et al. |
| 2018/0260125 | A1 | 9/2018 | Botes et al. |
| 2018/0293123 | A1 * | 10/2018 | Kondapalli ......... G06F 11/0751 |
| 2018/0300385 | A1 | 10/2018 | Merriman et al. |
| 2019/0163546 | A1 * | 5/2019 | Ungar ................ G06F 11/3476 |
| 2019/0171763 | A1 | 6/2019 | Cai et al. |
| 2019/0199515 | A1 | 6/2019 | Carver et al. |
| 2019/0392061 | A1 | 12/2019 | Terry et al. |
| 2020/0074416 | A1 | 3/2020 | Mathew |
| 2020/0252761 | A1 | 8/2020 | Podluzhny |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |

(56) References Cited

FOREIGN PATENT DOCUMENTS

| RU | 2670573 C2 | 10/2018 |
|---|---|---|
| WO | 2012065018 A2 | 5/2012 |
| WO | 2016197716 A1 | 12/2016 |

OTHER PUBLICATIONS

IEEE 100, The Authoritative Dictionary of IEEE Standards Terms, Seventh Edition, IEEE Press, 2000, pp. 245, 1184 (Year: 2000).*
Ex Parte Quale Action dated Oct. 22, 2020 received in respect of a related U.S. Appl. No. 16/560,409.
Office Action dated Oct. 23, 2020 received in respect of a related U.S. Appl. No. 16/504,040.
Notice of Allowance dated Oct. 15, 2020 received in respect of a related U.S. Appl. No. 16/433,186.
Russian Search Report dated Nov. 8, 2019 issued in respect of the Russian Patent Application No. RU2018132711.
Russian Search Report dated Nov. 26, 2019 issued in respect of the Russian Patent Application No. RU2018144176.
Russian Search Report dated Nov. 26, 2019 issued in respect of the Russian Patent Application No. RU2018132714.
Russian Search Report dated Nov. 25, 2019 issued in respect of the Russian Patent Application No. RU2018135452.
Kumar et al, "Optimized Particle Swarm Optimization Based Deadline Constrained Task Scheduling in Hybrid Cloud", ICTACT Journal of Soft Computing, Jan. 2016, vol. 06, Issue 02, pp. 1117-1122 (Year: 2016).
Shin et al, "Deadline-Guaranteed Scheduling Algorithm with Improved Resource Utilization for Cloud Computing", 12th Annual IEEE Consumer Communications and Networking Conference (CCNC), 2015, pp. 814-819 (Year: 2015).
Chopra et al, "Deadline and Cost based Workflow Scheduling in Hybrid Cloud", 2013, IEEE, pp. 840-846 (Year: 2013).
Yuan et al, "Deadline divison-based heuristic for cost optimization in workflow scheduling". Information Sciences 179 (2009) 2562-2575, Elsevier, pp. 2562-2575 (Year: 2009).
Srinivasan et al, "Deadline-based scheduling of periodic task systems on multiprocessors", Information Processing Letters 84 (2002), 93-98, Elsevier, pp. 93-98 (Year: 2002).
Russian Search Report dated Feb. 25, 2020 issued in respect of the Russian Patent Application No. RU2018147497.
Russian Search Report dated Feb. 25, 2010 issued in respect of the Russian Patent Application No. RU2018135460.
Ex Parte Quale Action dated Apr. 23, 2020 received in respect of a related U.S. Appl. No. 16/383,976.
Grefen et al. "Two-Layer Transaction Management for Workflow Management Applications", Database and Expert Systems Applications, pp. 430-439, publication date: Sep. 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al, "Constant Bandwidth Server Revisited", EWiLi'14, Nov. 2014, Lisbon, Portugal.
Virtuozzo Storage 2.3, Installation Guide, Dec. 14, 2017, retrieved from https://docs.virtuozzo.com/virtuozzo_storage_2_installation_guide/planning-virtuozzo-storage-infrastructure/understanding-data-redundancy.html.
Russian Search Report dated Oct. 30, 2019 issued in respect of the Russian Patent Application No. RU2018136221.
Office Action dated Dec. 4, 2020 received in respect of a related U.S. Appl. No. 16/401,688.
Office Action dated Jan. 1, 2021 received in respect of a related U.S. Appl. No. 16/384,301.
Office Action dated Nov. 20, 2020 received in respect of a related U.S. Appl. No. 16/776,011.
Notice of Allowance dated Mar. 23, 2021 received in respect of a related U.S. Appl. No. 16/574,277.
Notice of Allowance dated May 18, 2021 received in respect of a related U.S. Appl. No. 16/401,688.

* cited by examiner

METHOD OF DETERMINING POTENTIAL ANOMALY OF MEMORY DEVICE

CROSS-REFERENCE

The present application claims priority to Russian Patent Application No. 2018132711, entitled "Method of Determining Potential Malfunction of Memory Device," filed Sep. 14, 2018, the entirety of which is incorporated herein by reference.

FIELD OF TECHNOLOGY

The present technology relates to methods of controlling a memory device and, more specifically, to methods and systems for determining a potential malfunction of a memory device.

BACKGROUND

Memory devices such as hard disk drives (HDD), solid state drives (SSD) and memory sticks are ubiquitous. These memory devices are used in servers, data centers, laptop computers, tablet computers, smart phones, as well as in a plethora of other devices.

Integrity of data stored on memory devices depends on their physical state, namely on whether or not the memory device is functioning properly or is faulty to at least some degree for example.

A malfunctioning of a given memory device may affect not only the performance of the given memory device, such as read and write speeds, for example, but may also cause corruption or loss of some or even all data stored on the given memory device.

It is therefore generally desirable to know when the physical state, of a given memory device is affected, so that the given memory device may be repaired or replaced before data corruption or data loss occurs.

There are prior art methods and systems, such as the Self-Monitoring, Analysis and Reporting Technology (SMART) (™) technology, which is used to detect and report various indicators of drive reliability with the intent of anticipating imminent hardware failures.

As another example, US Patent Application No. US20130132057A1 discloses computerized methods, systems, and computer-storage media for throttling requests from virtual machines (VMs) to a hard-disk drive (HDD). When a request for disk I/O is received from a VM, a disk-drive model that simulates performance characteristics of the HDD is accessed. During access, the disk-drive model's estimation of HDD parameters and the disk-drive model's estimation of a current state of a disk head of the HDD are gathered. A projected execution time to carry out the request is computed as a function of the estimated HDD parameters and the estimated current state of the disk head. Also, an actual execution time to carry out the request is measured upon allowing the request to pass to the HDD. Using a comparison of the projected execution time and the actual execution time, the traffic of the requests from the VMs is throttled.

SUMMARY

Without wishing to be bound to any specific theory, developers of the present technology have appreciated that in at least some cases, prior art methods and systems for determining performance of memory devices have shortcomings and/or are not suitable for evaluating and monitoring the physical state of the memory devices.

The present technology has been developed based on developers' appreciation that there exists at least one problem associated each given prior art method and system for determining memory device performance at least for the purposes of evaluating whether or not a memory device is malfunctioning or has malfunctioned. The present technology has been developed with a view to ameliorating at least one of, and in some non-limiting implementations, different combinations of, such problems with the prior art.

Broadly speaking, implementations of the present technology are directed to methods and systems for determining memory device performance, and more particularly to methods and systems for determining when a potential malfunction is, or was, present in a given memory device in a given pre-determined period of time.

In some non-limiting implementations, the present technology allows determining and monitoring a given memory device's in-use performance in real-time.

In some non-limiting implementations, the present technology allows determining and monitoring a given memory device's in-use performance, in a way that is more representative of whether the given memory device is malfunctioning or has malfunctioned, in at least some applications, at particular times of day and/or on particular dates, for pre-determined in-use periods of time that precede the particular times of day and/or the particular dates at/on which the performance is to be determined.

In some non-limiting implementations, the present technology allows a problem with a given memory device to be flagged to a system administrator before the problem causes corruption or loss of data stored on that memory device. In some cases, the flagging allows the system administrator to replace the given memory device and to thereby avert the data corruption or loss that would have otherwise occurred.

In view of the above, and in accordance with a broad aspect of the present technology, there is provided a method of determining a potential malfunction of a memory device, the memory device for processing a plurality of transaction, the method executable at a supervisory entity computer, the supervisory entity computer being communicatively coupled to the memory device, the method comprising, over a pre-determined period of time: determining a subset of input/output (I/O) operations having been sent to the memory device for processing; applying at least one counter to determine an actual activity time of the memory device during the pre-determined period of time, the actual activity time being an approximation value representative of time the memory device took to process at least a portion of the subset of I/O operations; applying a pre-determined model to generate an estimate of a benchmark processing time for each one of the subset of transactions; calculating a benchmark processing time for the subset of I/O operations; generating a performance parameter based on the actual activity time and the benchmark processing time; and based on an analysis of the performance parameter, determining if the potential malfunction is present in the memory device.

In some non-limiting implementations, the memory device is a hard disk drive (HDD).

In some non-limiting implementations, the applying the pre-determined model comprises, for each sequential one of the subset of I/O operations: based on a size of the sequential one of the subset of I/O operations and a pre-determined speed of execution of a type of the sequential one of the subset of I/O operations, determining an execution time for the sequential one of the subset of I/O operations; determining if execution of the sequential one of the subset of I/O operations requires a full-cycle re-positioning of a writing head of the memory device from a position where a previous one of the subset of I/O operations terminated being recorded; and if full-cycle re-positioning is required, adding to the execution time a pre-determined full-cycle re-positioning time to derive the benchmark processing time.

In some non-limiting implementations, the pre-determined speed of execution and the pre-determined full-cycle re-positioning time have been pre-determined specifically for one of: the memory device; for a type of devices including the memory device.

In some non-limiting implementations, the method further comprises building the pre-determined model, the building the pre-determined model for one of: the memory device; a type of devices including the memory device.

In some non-limiting implementations, the building the pre-determined model comprises: determining, for the benchmark memory device, a speed of execution of a plurality of benchmarking I/O operations, the plurality of benchmarking I/O operations including a type associated with the subset of I/O operations having been sent to the memory device, the speed of execution being determined at least at: (i) an outer track and (ii) an inner track of the benchmark memory device; determining a speed of rotation of a disk of the benchmark memory device; determining a minimum delay required between ceasing executing of one of the plurality of benchmarking I/O operations and starting executing a subsequent one of the plurality of benchmarking I/O operations to enable the benchmark memory device to execute the subsequent one of the plurality of benchmarking I/O operations without requiring a full-cycle re-positioning of a hard disk of the benchmark memory device.

In some non-limiting implementations, the building the pre-determined model is executed by sending to the benchmark memory device a pre-determined number the benchmarking I/O operations before putting the benchmark memory device into use.

In some non-limiting implementations, the building the pre-determined model further comprises taking into account manufacturer-provided performance characteristics of the benchmark memory device.

In some non-limiting implementations, the at least one counter comprises: a first counter for counting a number of I/O operations sent to the memory device; and a second counter for counting a number of I/O operation-complete confirmations received from the memory device.

In some non-limiting implementations, the determining the actual activity time comprises: determining a total idle time by adding up all time intervals when a value of the first counter and a value of the second counter are the same; and subtracting the total idle time from the pre-determined period of time.

In some non-limiting implementations, the method further comprises executing the analysis of the performance parameter.

In some non-limiting implementations, the analysis comprises comparing the performance parameter to a threshold value of 1 and, responsive to the performance parameter being above 1, determining the potential malfunction.

In some non-limiting implementations, the memory device is one of a plurality of memory devices and wherein the analysis comprises determining a subset of memory devices that have: an average performance parameter over a second pre-determined time interval being above other average performance parameter of other ones of the plurality of memory devices; and a maximum performance parameter over the second pre-determined time interval being above other maximum performance parameter of other ones of the plurality of memory devices.

In some non-limiting implementations, the performance parameter is a ratio.

In some non-limiting implementations, the analysis comprises comparing the performance parameter to a threshold value; and responsive to the performance parameter being above the threshold value, determining the potential malfunction.

In some non-limiting implementations, the threshold value is 1.

In some non-limiting implementations, the at least one counter comprises a single counter that generates an indication of an actual processing time of the at least a portion of the subset of I/O operations.

In some non-limiting implementations, the analysis comprises comparing the performance parameter to a threshold value; and responsive to the performance parameter being below the threshold value, determining the potential anomaly as being present in a form of an over-performance of the memory device.

In some non-limiting implementations, the threshold value is 1.

In some non-limiting implementations, the memory device is an SSD.

In some non-limiting implementations, the method further comprises determining the performance parameter for each one of a plurality of memory devices, the SSD being one of the plurality of memory devices.

In some non-limiting implementations, the SSD has at least one of a model number and a part number; and the generating the performance parameter is further based on an SSD minimum delay pre-determined for a benchmark SSD, the benchmark SSD having the at least one of the model number and the part number as the SSD.

In some non-limiting implementations, the at least one counter includes a first counter for monitoring I/O operations sent to the SSD for processing, and a second counter for monitoring confirmations of completed I/O operations received from the SSD; and applying the at least one counter to determine the actual activity time of the SSD during the pre-determined period of time includes: executing the first counter to monitor I/O operations sent to the SSD for processing during the pre-determined period of time, executing the second counter to monitor confirmations of completed I/O operations received from the SSD during the pre-determined period of time, and determining a total of all time periods within the pre-determined period of time during which a value of the first counter was equal to a value of the second counter.

In some non-limiting implementations, the applying the at least one counter to determine the actual activity time of the SSD during the pre-determined period of time further includes subtracting from the pre-determined period of time the total of all time periods during which the value of the first counter was equal to the value of the second counter.

In some non-limiting implementations, the pre-determined model is further based on an SSD minimum delay pre-determined for the benchmark SSD.

In some non-limiting implementations, the pre-determined model is based on empirical testing of the benchmark SSD.

In some non-limiting implementations, the empirical testing includes sending a pre-determined number of benchmarking I/O operations to the benchmark SSD.

In some non-limiting implementations, the method further comprises generating the pre-determined model, the generating including: clearing an entirety of the benchmark SSD prior to the empirical testing of the benchmark SSD.

In some non-limiting implementations, the method further comprises building the pre-determined model before the SSD is put into use.

In some non-limiting implementations, the building the pre-determined model comprises taking into account manufacturer-provided performance characteristics of the benchmark SSD.

In some non-limiting implementations, the method further comprises executing the analysis of the performance parameter.

In some non-limiting implementations, the analysis comprises comparing the performance parameter to a threshold value; and responsive to the performance parameter being above the threshold value, determining the potential anomaly as being present in a form of a potential malfunction of the SSD.

In some non-limiting implementations, the SSD is one of a plurality of memory devices and wherein the analysis comprises determining a subset of the memory devices that have: an average performance parameter over a second pre-determined time interval being above other average performance parameter of other ones of the plurality of memory devices; and a maximum performance parameter over the second pre-determined time interval being above other maximum performance parameter of other ones of the plurality of memory devices.

In some non-limiting implementations, the analysis comprises comparing the performance parameter to a threshold value; and responsive to the performance parameter being below the threshold value, determining the potential anomaly as being present in a form of an over-performance of the SSD.

In some non-limiting implementations, the applying the pre-determined model comprises, for a given one of the subset of I/O operations: based on a size of the given one of the subset of I/O operations and a pre-determined speed of execution of the given one of the subset of I/O operations, determining an execution time of the given one of the subset of I/O operations; and determining a total execution time for the subset of I/O operations based the execution time of each given one of the subset of I/O operations.

In some non-limiting implementations, the total execution time for the subset of I/O operations includes an SSD minimum delay associated with each one of the subset of I/O operations.

In some non-limiting implementations, the at least one counter is a single counter that generates an indication of the actual activity time of the SSD during the pre-determined period of time.

In some non-limiting implementations, the SSD minimum delay is pre-determined for the benchmark SSD.

In accordance with another broad aspect of the present technology, there is provided a method of detecting a potential anomaly in in-use performance of a memory device, the method executable at a supervisory entity computer, the supervisory entity computer being communicatively coupled to the memory device, the method comprising, over a pre-determined period of time: determining a subset of input/output (I/O) operations having been sent to the memory device for processing; applying at least one counter to determine an actual activity time of the memory device during the pre-determined period of time, the actual activity time being representative of time the memory device took to process at least some of the subset of I/O operations; applying a pre-determined model to generate a benchmark processing time for the at least some of the subset of I/O operations; calculating a benchmark processing time for the at least some of the subset of I/O operations; generating a performance parameter based on the actual activity time and the benchmark processing time; and based on an analysis of the performance parameter, determining if the potential anomaly in the in-use performance of the memory device is present with respect to the memory device.

In accordance with yet another broad aspect of the present technology, there is provided a computer-implemented system for detecting a potential anomaly in a memory device, the system comprising a supervisory entity computer, the supervisory entity computer being communicatively coupled to the memory device, the supervisory entity computer having a processor and a non-transient memory communicatively coupled to the processor, the non-transient memory storing instructions thereon which when executed by the processor cause the supervisory entity computer to, over a pre-determined period of time: determine a subset of input/output (I/O) operations having been sent to the memory device for processing; apply at least one counter to determine an actual activity time of the memory device during the pre-determined period of time, the actual activity time being an approximation value representative of time the memory device took to process at least a portion of the subset of I/O operations; apply a pre-determined model to generate an estimate of a benchmark processing time for each one of the subset of transactions; calculate a benchmark processing time for the subset of I/O operations; generate a performance parameter based on the actual activity time and the benchmark processing time; and based on an analysis of the performance parameter, determine if the potential malfunction is present in the memory device.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims

BRIEF DESCRIPTION OF THE DRAWINGS

These and other features, aspects and advantages of the present technology will become better understood with regard to the following description, appended claims and accompanying drawings where:

DETAILED DESCRIPTION OF NON-LIMITING EMBODIMENTS

Figure 1:
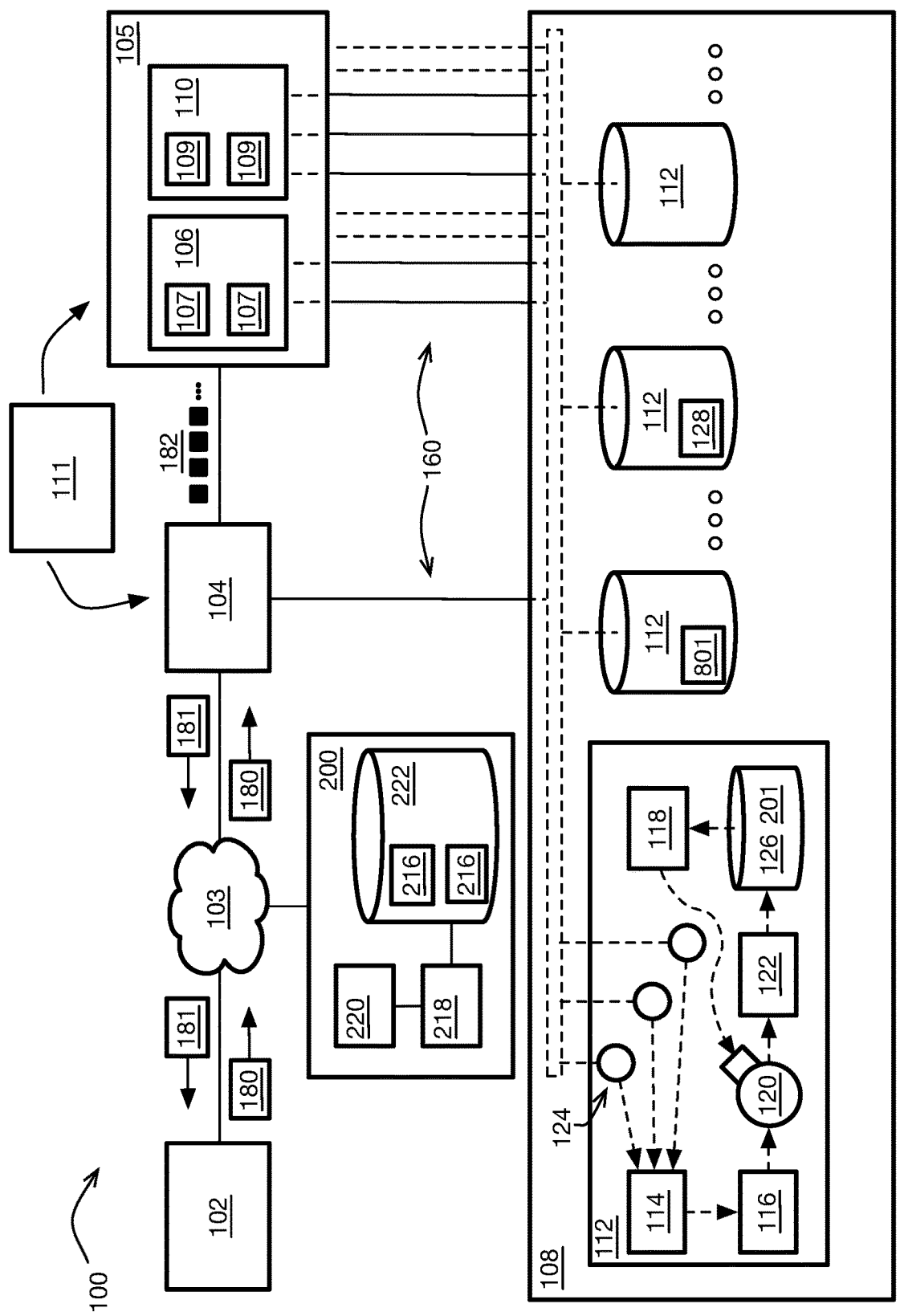
FIG. 1 depicts a schematic diagram of a distributed computer-processing system suitable for implementing non-limiting implementations of the present technology.

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100, however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 116, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transaction 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
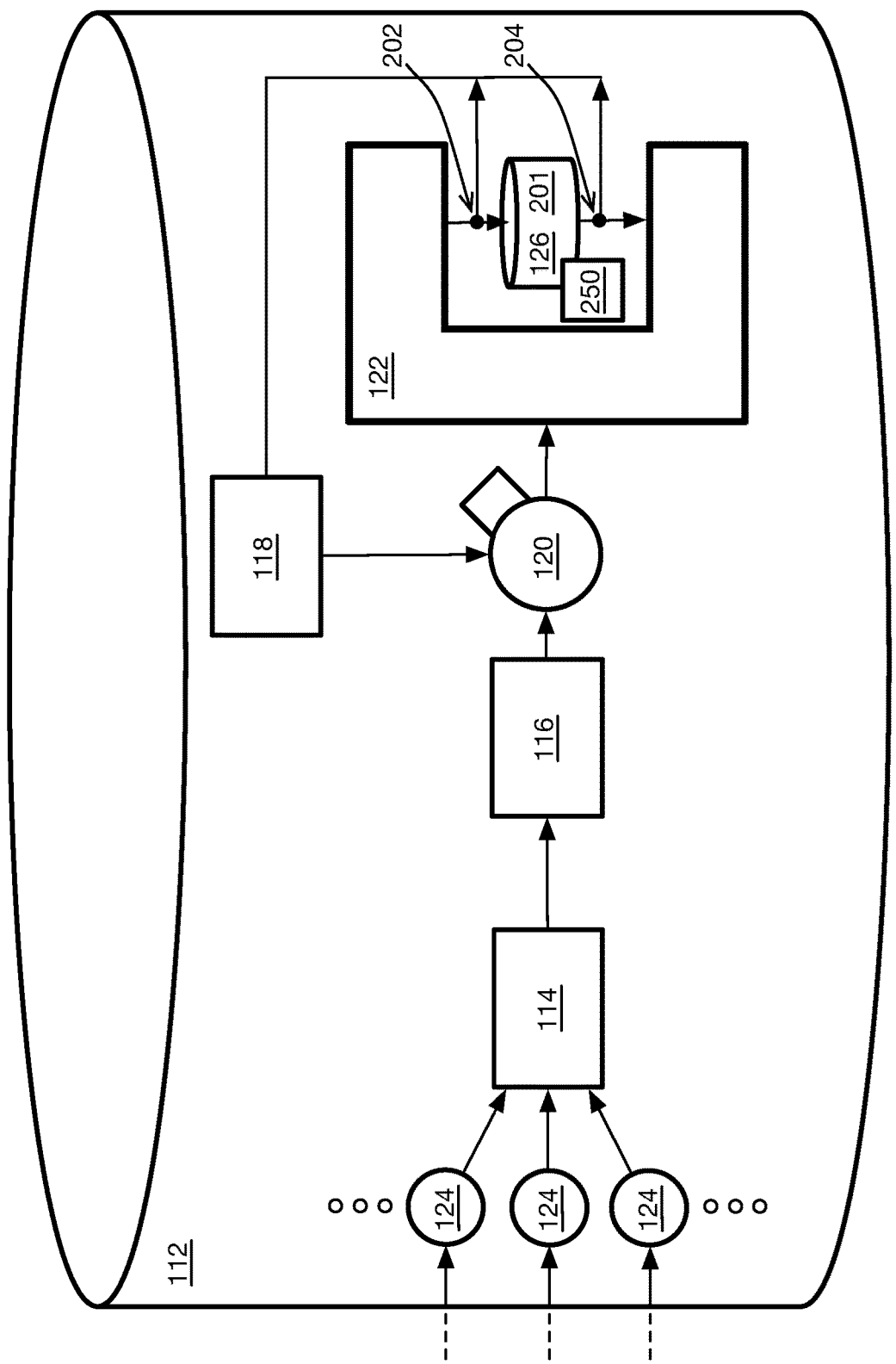
FIG. 2 depicts a schematic diagram of a storage device of the distributed computer-proces sing system of FIG. 1.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programing Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the scheduler 120 may be implemented as part of the Pdrive application 116. In other words, execution of various scheduling schemes may be performed by the Pdrive application 116, without departing from the scope of the present technology.

In one case, the scheduler 120 may provide a scheduling scheme of a "fair" type. It should be understood that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

In another case, the scheduler 120 may provide a scheduling scheme of a "real-time" type. It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In a further case, the scheduler 120 may provide a hybrid scheduling scheme. In other words, the scheduler 120 may provide a scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for current execution, a most efficient one (from the perspective of the memory drive 126) amongst all the I/O operations available to the memory drive 126 at a given moment in time.

For that reason, in some cases, although the scheduler 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the scheduler 120. Therefore, it may happen that the execution order may no longer respect the real-time requirements of the distributed processing system 100 (especially as additional I/O operations are received from the scheduler 120, which additional I/O operations may be more "efficient" from the perspective of the memory drive 126 and that may be picked over non-yet-executed I/O operations).

In order to ensure real-time operation of the storage device 112 and to avoid the above-described problem (which is also known as "operation stagnation"), the storage device 112 may include the real-time operation enforcing application 122. Broadly speaking, the real-time operation enforcing application 122 allows controlling which I/O operations amongst those that have been already ordered by the scheduler 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the scheduler 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Overview of Diagnostic Methods of Present Technology

In some embodiments of the present technology, one or more methods of determining a potential malfunction in given memory devices is/are used. In some embodiments, the methods also allow determining over-performance of the given memory device. In some embodiments, the methods are used with respect to the distributed computer-processing system 100 and allow to conduct preventative maintenance and/or replacement of memory devices identified to be faulty or deteriorating and/or improve reliability of the system and/or to improve system performance. The distributed computer-processing system 100 is an example of an environment in which the methods of the present technology may be performed. The methods can also be implemented with other computer systems and with respect to memory devices other than those described herein.

More particularly, with regard to the distributed storage sub-system 108 of the distributed computer-processing system 100, the methods of the present technology in some cases may allow determining/detecting a potential malfunction of one or more memory devices such as one or more of the memory drive 126 of the distributed storage sub-system 108, before the potential malfunction causes corruption and/or loss of data from the one or more of the memory drive 126. In some cases, this may allow a system administrator to conduct preventative maintenance on the one or more of the memory drive 126 determined to be potentially malfunctioning, by replacing or repairing the one or more of the memory drive 126 for example.

Referring to FIG. 1, in the example of the distributed computer-processing system 100 described herein above, one or more of the diagnostic methods of the present technology could be executed at a supervisory entity computer 200. As shown in FIG. 1, the supervisory entity computer 200 includes a processor 218, a non-transient memory 220 communicatively coupled to the processor 218, and in some non-limiting implementations a local storage device 222 communicatively coupled to the processor 218.

In some embodiments of the present technology, the supervisory entity computer 200 could be accessible to one or more system administrators or other service personnel. In some embodiments of the present technology, the supervisory entity computer 200 could be a server issuing automatic maintenance/service requests in response to indications of potential malfunctions detected via execution of the methods of the present technology.

As schematically shown in the example of FIG. 1, the supervisory entity computer 200 is communicatively coupled to each of the memory drive 126 of the distributed storage sub-system 108 via the communication network 103. It is contemplated however, that any other suitable connection route could be used, such as a direct connection to the distributed storage sub-system 108 for example.

Some non-limiting implementations of the diagnostic methods of the present technology will be illustrated herein below with regard to the memory drive 126 of a given storage device 112 of the distributed storage sub-system 108. In some non-limiting implementations, this memory drive 126 is an HDD 201.

Some additional implementations of the diagnostic methods of the present technology will be illustrated herein below with regard to another storage device 112 of the distributed storage sub-system 108, which includes an SSD 801.

While the methods of the present technology are illustrated with regard to the HDD 201 and the SSD 801, the methods of the present technology are also applicable to other types of storage devices 112, including combinations of different types of storage devices 112. For the sake of a non-limiting example, the methods of the present technology could be used to simultaneously monitor a plurality of HDDs and a plurality of SSDs.

Diagnostic Methods

An aspect of some non-limiting implementations of the diagnostic methods of the present technology is that for a given memory device, input/output (I/O) operations, such as read operations and write operations, being sent to the given memory device for processing are monitored over a predetermined period of time. The time when each given operation is sent to the given memory device and the time when a confirmation that the given operation has been processed are determined. From these times, an actual time that it took for the given memory device to process the I/O operations is derived.

A prediction model which has been pre-generated based on a benchmark memory device that is the same as the given memory device is used to generate an estimate of a benchmark processing time for those of the I/O operations, which can be referred to as the benchmark processing time. At the time of the generation of the prediction model, the benchmark memory device is known to be a brand new device and is known to perform well.

Accordingly, the generated benchmark processing time for a set of I/O operations represents a predicted time that the benchmark memory device would take to process/complete the set of I/O operations. In broader terms, the benchmark processing time generated by the prediction model for these I/O operations represents a desired level of performance of any device that is the same as the benchmark memory device.

The method then proceeds with generating a performance parameter based on the determined actual execution time of the particular I/O operations and the benchmark processing time for the particular I/O operations. The performance parameter is then analyzed to determine whether a potential malfunction is/was present in the given memory device.

In at least some cases, an indication of a potential malfunction in the given memory device is generated in response to a determination that the potential malfunction is/was present in the given memory device. In some non-limiting implementations, the analysis of the performance parameter is also used to indicate a potential over-performance of the given memory device relative to the benchmark memory device.

Creators of the present technology have found that, in at least some applications and at least in some cases, identification and replacement of a given memory device in a plurality of memory devices as soon as (or shortly after) the given memory device starts to become damaged or experiences some kind of physical deterioration results in significant improvements in overall system performance, and increases reliability thereof.

In such applications, underperformance of even one of the memory devices in the cluster slows down the overall cluster performance. The creators of the present technology have found that for such applications in particular, in some cases replacing memory device(s) identified as having a potential malfunction by the methods of the present technology increases the overall cluster performance.

The creators of the present technology have also found that the diagnostic methods of the present technology in some cases allow for identification of underperforming memory devices which according to prior art diagnostic methods may be believed to be performing normally. Accordingly, it has been found that in some cases the diagnostic methods of the present technology allow to avoid data corruption and/or improve system performance whereas prior art diagnostic methods are not helpful.

Diagnostic Methods: Hard Disk Drive Implementations

A non-limiting implementation of a method 600 of determining a potential malfunction of a memory device will be described herein below with regard to the HDD 201 of one of the storage devices 112 of the distributed storage sub-system 108. Referring to FIG. 1, the method 600 is executable at the supervisory entity computer 200, which is communicatively coupled to the HDD 201 of the one of the storage devices 112 of the distributed storage sub-system 108. The storage device 112 comprising the HDD 201 is shown in FIGS. 1 and 2. The HDD 201 is one particular non-limiting example of a memory drive 126 to which the method 600 is applicable.

In some non-limiting implementations, at least some of the methods described herein are executable at least partially at the storage device 112 comprising the HDD 201. In some non-limiting implementations, at least some of the methods described herein are executable fully at the storage device 112 comprising the HDD 201. In some non-limiting implementations, at least some of the methods described herein are executable at least partially at the request source 102. In some non-limiting implementations, at least some of the methods described herein are executable fully at the request source 102. It is contemplated that the methods described herein could also be executed at one or more other locations.

For the sake of an example only, the HDD 201 in some non-limiting implementations is a Barracuda™ 2-terabyte (TB) Serial Advanced Technology Attachment (SATA) 3.5-inch hard disk drive, manufactured by Seagate Technology Company, having a part number ST2000DM006, and a model number that is the same as the part number (ST2000DM006).

The particular HDD 201 has a specified maximum sustained data transfer rate of 220 megabytes per second (MB/s). In other implementations, the HDD 201 has a different part number and model number, and different arrangements and performance levels of hard disks and R/W heads.

Figure 3:
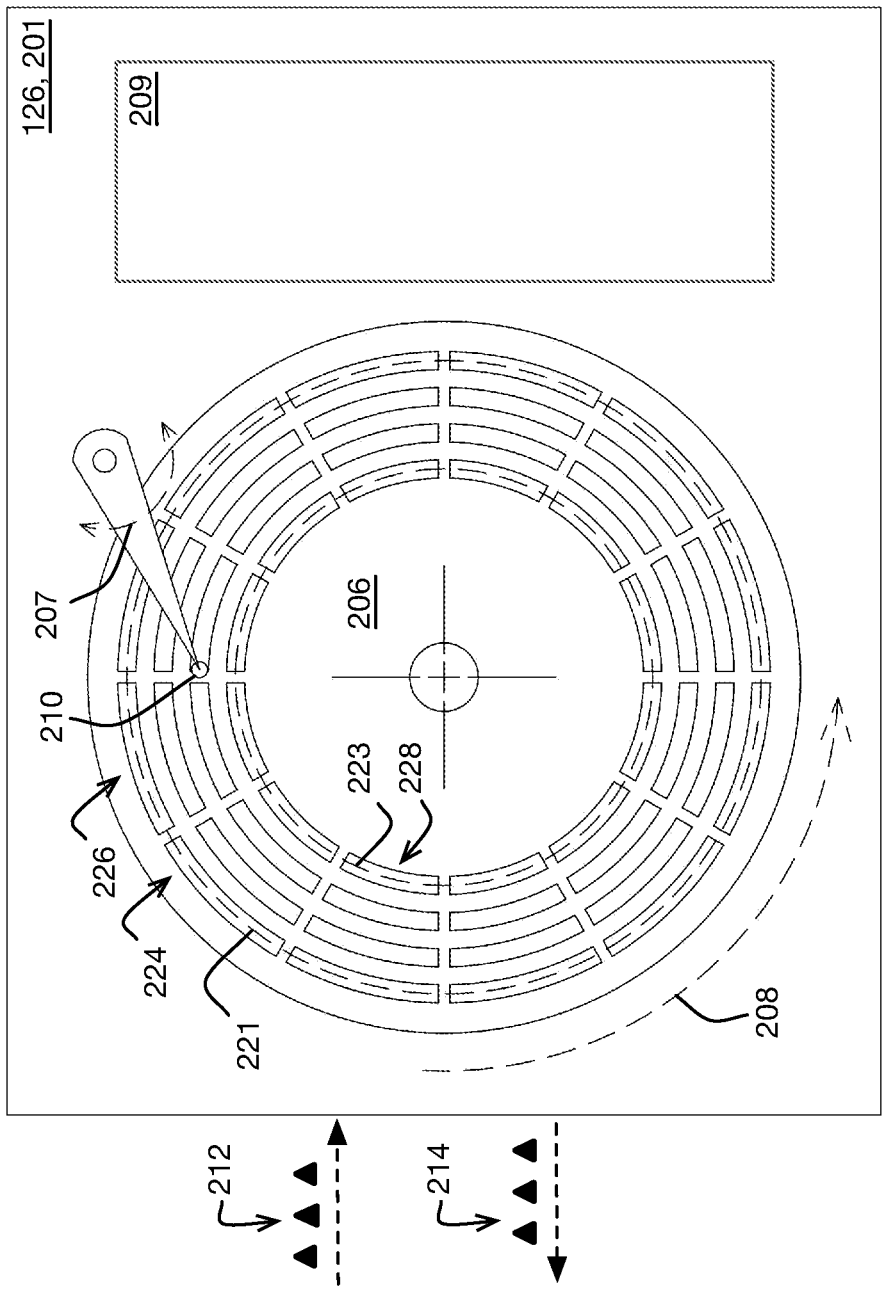
FIG. 3 depicts a schematic diagram of an HDD of the storage device of FIG. 2.

As shown in FIG. 3, the present example of the HDD 201 has a hard disk 206 rotatable in a direction shown with arrow 208, and a read/write (R/W) head 210, which are operated by a controller 209 of the HDD 201. The controller 209 of the HDD 201 is conventionally known and is therefore not described herein in detail. For simplicity, some operations received, managed and/or executed by the controller 209 of the HDD 201 are simply referred to as being received, managed and/or executed by the HDD 201. For the purposes of this description, each R/W head 210 of the HDD 201 can also be referred to as a writing head of the HDD 201.

The R/W head 210 is movable relative to the hard disk 206, as shown with arrow 207, for reading data from the hard disk 206 and for writing data to the hard disk 206.

The hard disk 206 has a plurality of tracks 224, including an outer track 226 and an inner track 228. Each of the tracks 224 comprises a plurality of sectors. For example, the outer track 226 comprises a plurality of sectors 221 and the inner track 228 comprises a plurality of sectors 223. The R/W head 210 writes data to and reads data from specific ones of the sectors of the hard disk 206.

In use, the HDD 201 receives I/O operations, such as read operations and write operations, shown as triangles 212, from the Vdrive application 114, via corresponding components of the distributed computer-processing system 100 described above, for processing. The HDD 201 processes the I/O operations 212.

For example, the R/W head 210 of the memory drive 126 executes a given write operation of the plurality of I/O operations 212 to a particular sector/location on the hard disk 206, as specified in the write operation. Similarly, the R/W head 210 of the HDD 201 executes a given read operation of the plurality of I/O operations 212 from a particular sector/location on the hard disk 206, as specified in the read operation.

For each processed I/O operation 212, the HDD 201 returns/issues a confirmation that the HDD 201 has completed/processed the I/O operation 212. These confirmations may be referred to as I/O operation-complete confirmations and are shown as triangles 214.

The supervisory entity computer 200 monitors the I/O operations 212 being sent to the HDD 201 and the I/O operation-complete confirmations 214 being returned by HDD 201.

In some non-limiting implementations, the supervisory entity computer 200 executes the monitoring over a plurality of pre-determined periods of time, such as over pre-determined periods of 15 seconds for example. In some non-limiting implementations, the pre-determined periods of time are spaced out over pre-determined intervals of time during a day. For example, in some non-limiting implementations, the supervisory entity computer 200 executes the monitoring over consecutive pre-determined periods of 15 seconds of each 24 hours of each day, continuously.

In some non-limiting implementations, the supervisory entity computer 200 stores the various outputs of the method 600 in one or more data structures 216. In the present implementation, the one or more data structures 216 (FIG. 1) are stored locally at the supervisory entity computer 200. However, the one or more data structures 216 could be stored at any suitable/desired location.

As depicted in FIG. 2, in some non-limiting implementations, for the monitoring, the supervisory entity computer 200 executes a first counter 202 that monitors I/O operations 212 being sent to the HDD 201 for processing, and a second counter 204 that monitors the I/O operation-complete confirmations 214 being returned/issued by the HDD 201.

In some non-limiting implementations, the first counter 202 has an integer value that is representative of a number of the number of I/O operations 212 that have been sent to the HDD 201, which number is zero when no I/O operations have yet been sent to the HDD 201. In some non-limiting implementations, the first counter 202 is cumulative.

In some non-limiting implementations, the second counter 204 has an integer value that is representative of the number of I/O operation-complete confirmations 214 that have been returned/issued by the HDD 201, which number is zero when no operation-complete confirmations have yet been returned/issued by the HDD 201. In some non-limiting implementations, the second counter 204 is cumulative.

The values of the first counter 202 and the second counter 204, which could also be referred to as outputs, are monitored, as described in more detail herein below.

In some non-limiting implementations, a single counter is used. For example, in some non-limiting implementations a single counter is configured to carry out both the function carried out by the first counter 202 and the second counter 204.

Figure 4:
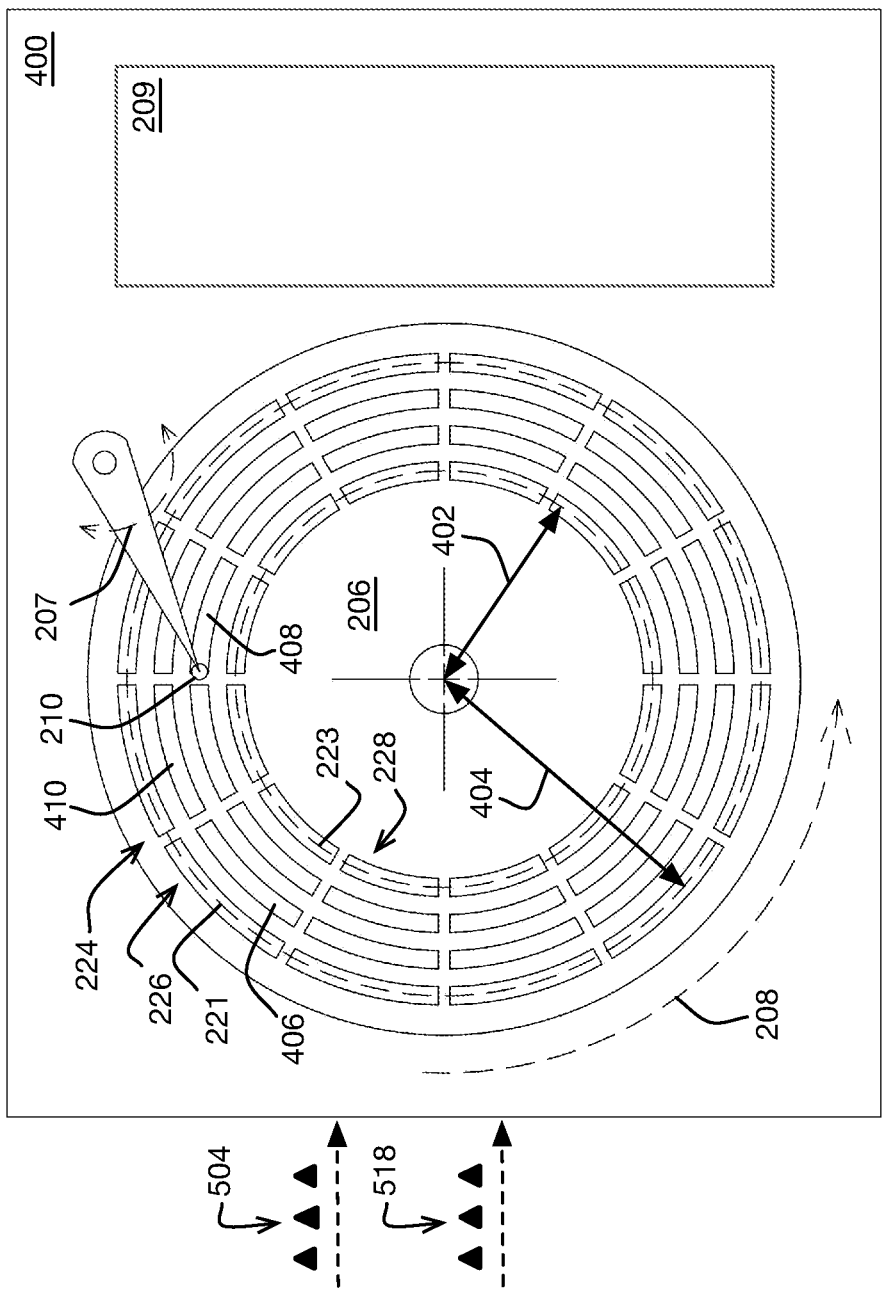
FIG. 4 depicts a schematic diagram of a benchmark HDD, the benchmark HDD having one and the same model number as the HDD of FIG. 3.

Referring to FIG. 4, a benchmark memory device 400, which is an HDD, is shown. As described in more detail herein below, the benchmark HDD 400 is used as a baseline with respect to which in-use operation of the HDD 201 is analyzed to determine/detect potential malfunctions and/or potential over-performance of the HDD 201. To this end, the benchmark HDD 400 is a new device that is known to be in an "ideal" or other desirable physical state or otherwise operating at a desired level of performance.

The benchmark HDD 400 is the same as the HDD 201. That is, the benchmark HDD 400 is also a Barracuda™ 2-terabyte (TB) Serial Advanced Technology Attachment (SATA) 3.5-inch hard disk drive, manufactured by Seagate Technology Company, having a part number ST2000DM006, a model number ST2000DM006, and a specified maximum sustained data transfer rate of 220 megabytes per second (MB/s). It is noted that in some non-limiting implementations, the HDD 201 was the benchmark HDD 400 when it was new.

As shown in FIG. 4, the benchmark HDD 400 has the same parts as the HDD 201. Accordingly, the parts of the benchmark HDD 400 have been labeled with the same reference numerals as the corresponding parts of the HDD 201 and will not be described herein in more detail.

The creators of the present technology have appreciated that while a given memory device, such as the HDD 201 and the benchmark HDD 400, is typically provided by a manufacturer thereof with specifications setting out the given memory device's performance, these specifications are in some cases not sufficiently accurate and cannot be used as a benchmark or baseline for performance in some cases.

The creators of the present technology have also appreciated that typical performance specifications for memory devices are provided in terms of an average sustainable level of performance, a maximum sustainable level of performance, a level of performance at a particular operating condition, and the like, while in-use performance actually varies depending on the particulars of each given operating condition at each different point in time.

For example, the creators of the present technology have appreciated that read/write performance of an HDD varies depending on whether a given R/W head of the HDD is operating at an inner track 228 or an outer track 226 of a corresponding hard disk of the HDD. For example, the creators of the present technology have appreciated that read/write performance of the HDD 201 varies depending on whether the R/W head 210 of the HDD 201 is operating at the inner track 228 or the outer track 226 of the hard disk 206 thereof.

Accordingly, the present technology uses the benchmark HDD 400 to construct/pre-determine a predictive model, prior to putting the HDD 201 into use. The pre-determined model predicts performance of the benchmark HDD 400 at different operating conditions. In some non-limiting implementations, the pre-determined model for the HDD 201 is embodied in the respective drive model application 118 (FIG. 1). In other non-limiting implementations, the predetermined model for the HDD 201 is stored and executed at the supervisory entity computer 200.

The pre-determined model for the HDD 201 generates a performance baseline against which performance of the HDD 201 is analyzed in order to determine/detect potential malfunctions or potential over-performance of the HDD 201.

That is, as it will be described in more detail herein below, the pre-determined model is applied to generate a benchmark processing time for a given set of I/O operations 212 processed by the HDD 201 based on at least some particulars of the given set of I/O operations 212 and/or the locations on a hard disk at which the given set of I/O operations 212 have been performed/completed or are to be performed/completed.

The benchmark processing time represents an estimate of time that it would take or that it would have taken the benchmark HDD 400 to process/complete the given set of I/O operations 212.

HDD: Method of Constructing Predictive Model

Figure 5:
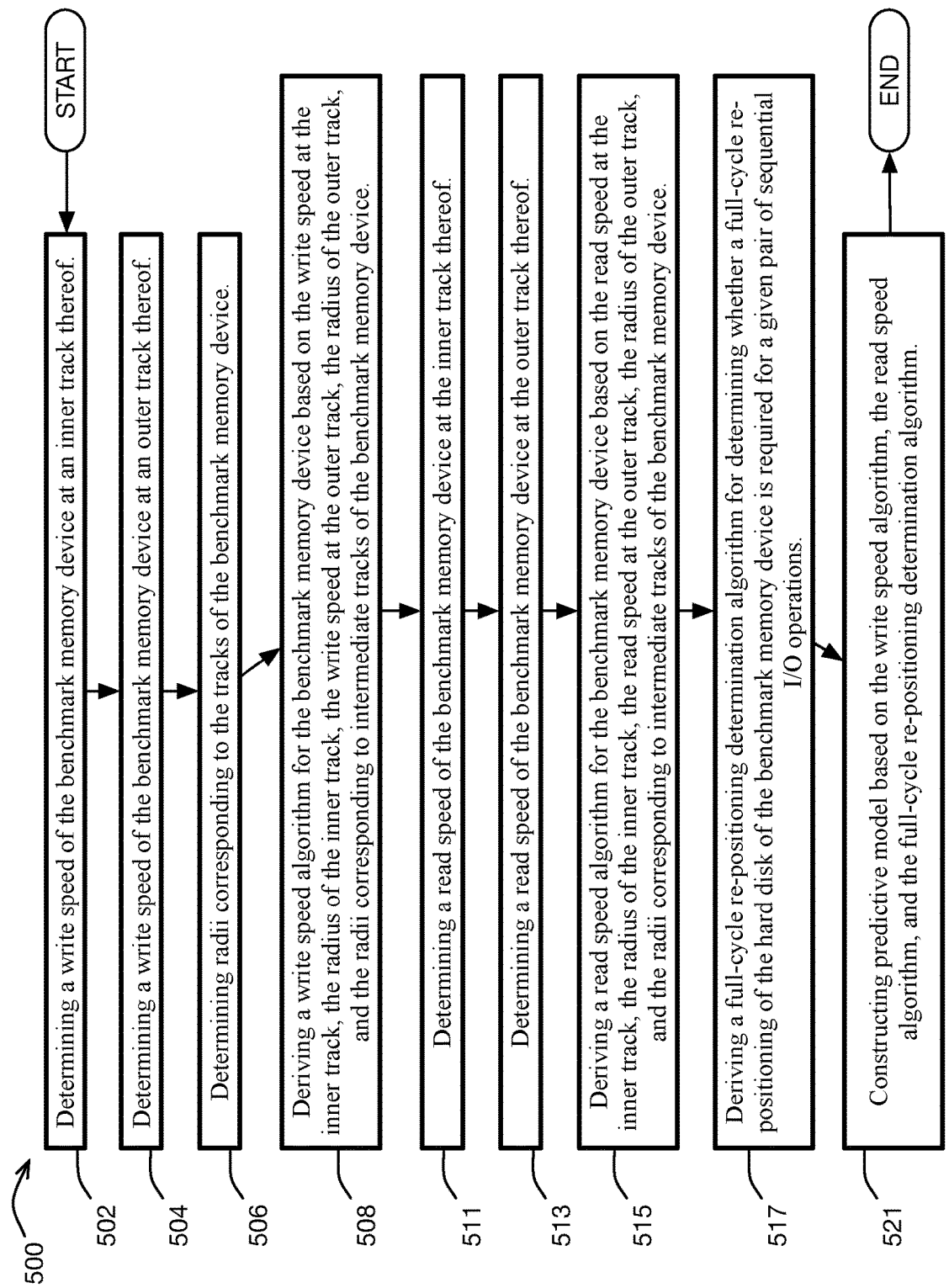
FIG. 5 depicts a block diagram showing a method of constructing the predictive model for the benchmark HDD of FIG. 4.

A non-limiting implementation of a method 500 of constructing the predictive model is described next, with respect to FIGS. 4 and 5.

Step 502—Determining a Write Speed of the Benchmark Memory Device at an Inner Track thereof.

At step 502, a sequential plurality of write operations 504 of one or more particular sizes (measured in bytes for example), shown as triangles in FIG. 4, are sent to the benchmark HDD 400 to be processed/executed at the inner track 228 thereof. The R/W head 210 of the benchmark HDD 400 processes/executes the plurality of write operations 504, and a write speed of the benchmark HDD 400 at the inner track 228 thereof is derived.

Step 504—Determining a Write Speed of the Benchmark Memory Device at an Outer Track Thereof.

At step 504, the plurality of write operations 504 is sent to the benchmark HDD 400 to be processed/executed at the outer track 226 thereof. The R/W head 210 of the benchmark HDD 400 processes/executes the plurality of write operations 504, and a write speed of the benchmark HDD 400 at the outer track 226 thereof is derived.

Step 506—Determining Radii Corresponding to the Tracks of the Benchmark Memory Device.

At step 506, a radius 404 of the hard disk 206 corresponding to the outer track 226 and a radius 402 of the hard disk 206 corresponding to the inner track 228 are determined, either via measurement of the hard disk 206 or via manufacturer specifications. Additionally, the radius corresponding to each track between the outer track 226 and the inner track 228 is also determined, either via measurement of the hard disk 206, via manufacturer specifications, or via interpolation based on the radius 404 and the radius 402, and a predetermined spacing between each pair of adjacent ones of the tracks between the outer track 226 and the inner track 228.

The tracks positioned between the outer track 226 and the inner track 228 are further referred to as the intermediate tracks. The radii corresponding to respective ones of the tracks positioned between the outer track 226 and the inner track 228 are further referred to as the intermediate radii.

It is contemplated that other methods of determining the radius 404, the radius 402 and the intermediate radii could be used. As shown in FIG. 4, each of the radius 404, the radius 402, and intermediate radii is measured from a center of rotation of the hard disk 206 of the benchmark HDD 400.

Step 508—Deriving a Write Speed Algorithm for the Benchmark Memory Device Based on the Write Speed at the Inner Track, the Radius of the Inner Track, the Write Speed at the Outer Track, the Radius of the Outer Track, and the Radii Corresponding to Intermediate Tracks of the Benchmark Memory Device.

At step 508, a write speed algorithm is derived based on the determined write speed at the outer track 226, the radius 404 corresponding to the outer track 226, the determined write speed at the inner track 228, the radius 402 corresponding to the inner track 228, and the radii corresponding to the intermediate tracks.

The write speed algorithm determines/predicts the sequential write speed of the benchmark HDD 400 at each intermediate track based on the intermediate radius corresponding to the intermediate track. In the present non-limiting implementation, the write speed algorithm uses a linear interpolation function. The write speed algorithm serves as part of the basis for the model for predicting the benchmark processing time, which model will be generated in a subsequent step described herein below.

Step 511—Determining a Read Speed of the Benchmark Memory Device at the Inner Track Thereof.

At step 511, a sequential plurality of read operations 518 of one or more particular sizes (measured in bytes for example), shown as triangles in FIG. 4, are sent to the benchmark HDD 400 to be processed/executed at the inner track 228 thereof. The R/W head 210 of the benchmark HDD 400 processes/executes the plurality of read operations 518, and a read speed of the benchmark HDD 400 at the inner track 228 thereof is derived.

Step 513—Determining a Read Speed of the Benchmark Memory Device at the Outer Track Thereof.

At step 513, the plurality of read operations 518 is sent to the benchmark HDD 400 to be processed/executed at the outer track 226 thereof. The R/W head 210 of the benchmark HDD 400 processes/executes the plurality of read operations 518, and a read speed of the benchmark HDD 400 at the outer track 226 thereof is derived.

Step 515—Deriving a Read Speed Algorithm for the Benchmark Memory Device Based on the Read Speed at the Inner Track, the Radius of the Inner Track, the Read Speed at the Outer Track, the Radius of the Outer track, and the Radii Corresponding to Intermediate Tracks of the Benchmark Memory Device.

At step 515, a read speed algorithm is derived based on the determined read speed at the outer track 226, the radius 404 corresponding to the outer track 226, the determined read speed at the inner track 228, the radius 402 corresponding to the inner track 228, and the radii corresponding to the intermediate tracks. The read speed algorithm determines/predicts the sequential read speed of the benchmark HDD 400 at each intermediate track based on the intermediate radius corresponding to the intermediate track. In the present non-limiting implementation, the read speed algorithm uses a linear interpolation function. The read speed algorithm serves as part of the basis for the model for predicting the benchmark processing time, which model will be generated in a subsequent step described herein below.

Step 517—Deriving a Full-Cycle Re-Positioning Determination Algorithm for Determining whether a Full-Cycle Re-Positioning of the Hard Disk of the Benchmark Memory Device is Required for a Given pair of Sequential I/O Operations.

At step 517, a plurality of I/O operations 520, is sent to the benchmark HDD 400 to be processed/executed at different tracks and at different ones of the sectors of the hard disk 206 thereof. In some non-limiting implementations, the I/O operations 520 include sequential and non-sequential read operations at the same and/or different tracks of the hard disk 206 and sequential and non-sequential write operations at the same and/or different tracks of the hard disk 206.

For each pair of sequential ones of the I/O operations 520, which could be at the same track or different tracks of the hard disk 206, it is determined using a suitable method whether a full-cycle re-positioning of the hard disk 206 is required.

For a given such pair of sequential ones of the I/O operations 520, a full-cycle re-positioning of the hard disk 206 is a rotation of the hard disk 206 that is required in order to position the R/W head 210 of the benchmark HDD 400 from the position at which the R/W head 210 completed a first one of the pair of I/O operations 520 to the position at which the R/W head 210 needs to be to start the sequentially next one of the pair of I/O operations 520.

If on the other hand the position at which the R/W head 210 needs to be to start executing the sequentially next one of the pair of I/O operations 520 is sufficiently "far" from the position on the hard disk 206 at which the R/W head 210 finishes executing the first one of the pair of I/O operations 520 in the direction 208 and the R/W head 210 consequently becomes positioned correctly and is ready to start executing the sequentially next one of the pair of I/O operations 520 before the R/W head 210 reaches the location of the sequentially next one of the pair of I/O operations 520, then a full-cycle re-positioning of the hard disk 206 is not required.

In some cases, there may be "processing" or other "auxiliary steps" to be executed by the controller 209 of the HDD 400 in order to prepare to execute the sequentially next one of the pair of I/O operations 520. In such cases the position at which the R/W head 210 needs to be to start executing the sequentially next one of the pair of I/O operations 520 must be sufficiently "far" from the position on the hard disk 206 at which the R/W head 210 finishes executing the first one of the pair of I/O operations 520 in the direction 208, such that the R/W head 210 has time to get repositioned and the controller 209 has enough time to prepare to execute the sequentially next one of the pair of I/O operations 520 before the R/W head 210 the start location associated with the sequentially next one of the pair of I/O operations 520.

As shown in FIG. 4, for the sake of an example, if a first I/O operation is to be executed by the R/W head 210 at the sector 406 (with the hard disk 206 rotating in the direction 208), and a sequentially next I/O operation is to be executed by the R/W head 210 at the sector 408, the R/W head 210 repositions from the intermediate track containing the sector 406 to the intermediate track containing the sector 408 before the hard disk 206 rotates sufficiently to align the R/W head 210 with the start of the sector 408. Therefore, from the time that the R/W head 210 completes the first I/O operation in sector 406 to the time that the R/W head 210 starts the sequentially next I/O operation at sector 408, the hard disk 206 rotates in the direction 208 by about thirty degrees, and thus does not need to execute a full-cycle re-positioning.

On the other hand, also as shown in FIG. 4 for the sake of an example, if the first I/O operation is to be executed by the R/W head 210 at the sector 410 and the sequentially next I/O operation is to be executed by the R/W head 210 at the sector 408, the hard disk 206 must execute a full-cycle re-positioning before the R/W head 210 is repositioned from the end of the sector 410 to the start of the sector 408. In this non-limiting example, the full-cycle re-positioning means that the hard disk 206 must rotate a full 360 degrees plus the radial angle between the end of the sector 410 and the start of the sector 408 before the R/W head 210 is repositioned from the end of the sector 410 to the start of the sector 408.

In some non-limiting implementations, the I/O operations 520, and whether or not a full-cycle re-positioning is required for each sequential pair thereof is required, are recorded into a full-cycle re-positioning data structure.

Next, in some non-limiting implementations, using the data in the full-cycle re-positioning data structure and a suitable empirical method, a full-cycle re-positioning determination algorithm is derived. The full-cycle re-positioning determination algorithm predicts/determines whether a full-cycle re-positioning of the hard disk 206 of the benchmark HDD 400 is required for a given pair of sequential I/O operations.

In some non-limiting implementations, the full-cycle re-positioning determination algorithm determines whether a full-cycle re-positioning of the hard disk 206 of the benchmark HDD 400 is required for a given pair of sequential I/O operations based on at least one of: the particular sizes (measured in bytes, or megabytes for example) of the given pair of sequential I/O operations, the speed of rotation of the hard disk 206, and the relative distance between and/or relative position of the tracks of the hard disk 206 corresponding to the given pair of sequential I/O operations.

In some non-limiting implementations, the full-cycle re-positioning determination algorithm also determines full-cycle re-positioning times associated with required full-cycle re-positioning occurrences. In some non-limiting implementations, a full-cycle re-positioning time is pre-determined for a given benchmark HDD 400, and the HDD 201, based on measurement/testing including in some non-limiting implementations empirical/analytical techniques of the measurement/testing results.

In some non-limiting implementations, the full-cycle re-positioning determination algorithm also determines a minimum delay required between ceasing executing of a first one of a given pair of sequential I/O operations and starting executing a subsequent one of the given pair of sequential I/O operations to enable the benchmark memory device to execute the subsequent one of the given pair of sequential I/O operations without requiring a full-cycle re-positioning of a hard disk 206 of the benchmark HDD 400.

Step 521—Constructing Predictive Model Based on the Write Speed Algorithm, the Read Speed Algorithm, and the Full-Cycle Re-Positioning Determination Algorithm.

At step 521, a predictive model is constructed/determined based on the write speed algorithm, the read speed algorithm, and the full-cycle re-positioning determination algorithm. That is, in some non-limiting implementations, the predictive model comprises at least some from of or a derivation of the write speed algorithm, the read speed algorithm, and the full-cycle re-positioning determination algorithm. It is contemplated that other methods and/or other constructions of the predictive model could be used.

The resulting predictive model (i.e. the pre-determined model) generates, for a given subset of I/O operations processed and/or to be processed, by the benchmark HDD 400, or the HDD 201, a benchmark processing time associated with that given subset of I/O operations.

In other words, the given subset of I/O operations can be inputted into the predictive model, with the predictive model outputting the benchmark processing time representative of the time that the benchmark HDD 400 would take, or should have taken, to process/complete the given subset of I/O operations.

Similarly, since the benchmark HDD 400 is the same as the HDD 201, the benchmark processing time is representative of the time that the HDD 201 would take, or should have taken, to process/complete the given subset of I/O operations.

As seen from the various steps of the method 500 described herein above, the predictive model takes into account the actual operating characteristics (as contrasted with solely manufacturer-provided characteristics) of the benchmark HDD 400. It is contemplated that the predictive model could be constructed/pre-determined based on the benchmark HDD 400 using a different method and could take into account a set of variables and constants that is different from the set of variables and constants described herein above.

At an optional step, the effective read and write speeds of the benchmark HDD 400 for various types of and/or sequences of I/O operations that are determined based on the steps described herein above are compared to the manufacturer-provided performance characteristics, described herein above, of the benchmark HDD 400. Based on the comparison, it is determined whether an error may have been made at any stage described herein above. If such a case, one or more steps verification steps are taken.

That is for example where a read speed or a write speed of the benchmark HDD 400 predicted for a given subset of I/O operations deviates from a manufacturer-provided read speed or write speed by more than a given threshold magnitude, the steps leading to the derivation/calculation/determination of the read speed or the write speed are verified to ensure that no errors have been made.

Additionally, where a read speed or a write speed of the benchmark HDD 400 deviates from a manufacturer-provided read speed or write speed by more than a given threshold magnitude, the benchmark HDD 400 may be tested to ensure that it is in an "ideal", "new", or "desired" physical operating state, as may be appropriate for a given application thereof. It is contemplated that these verification steps may be omitted.

With the predictive model now having been generated, a particular non-limiting implementation of a method 600 of determining a potential malfunction of the HDD 201 is described next, with reference to FIG. 6.

HDD: Method of Determining Potential Malfunction/Over-Performance

Step 602—Over a Pre-Determined Period of Time Determining a Subset of I/O Operations Having been Sent to the Memory Device for Processing.

Figure 6:
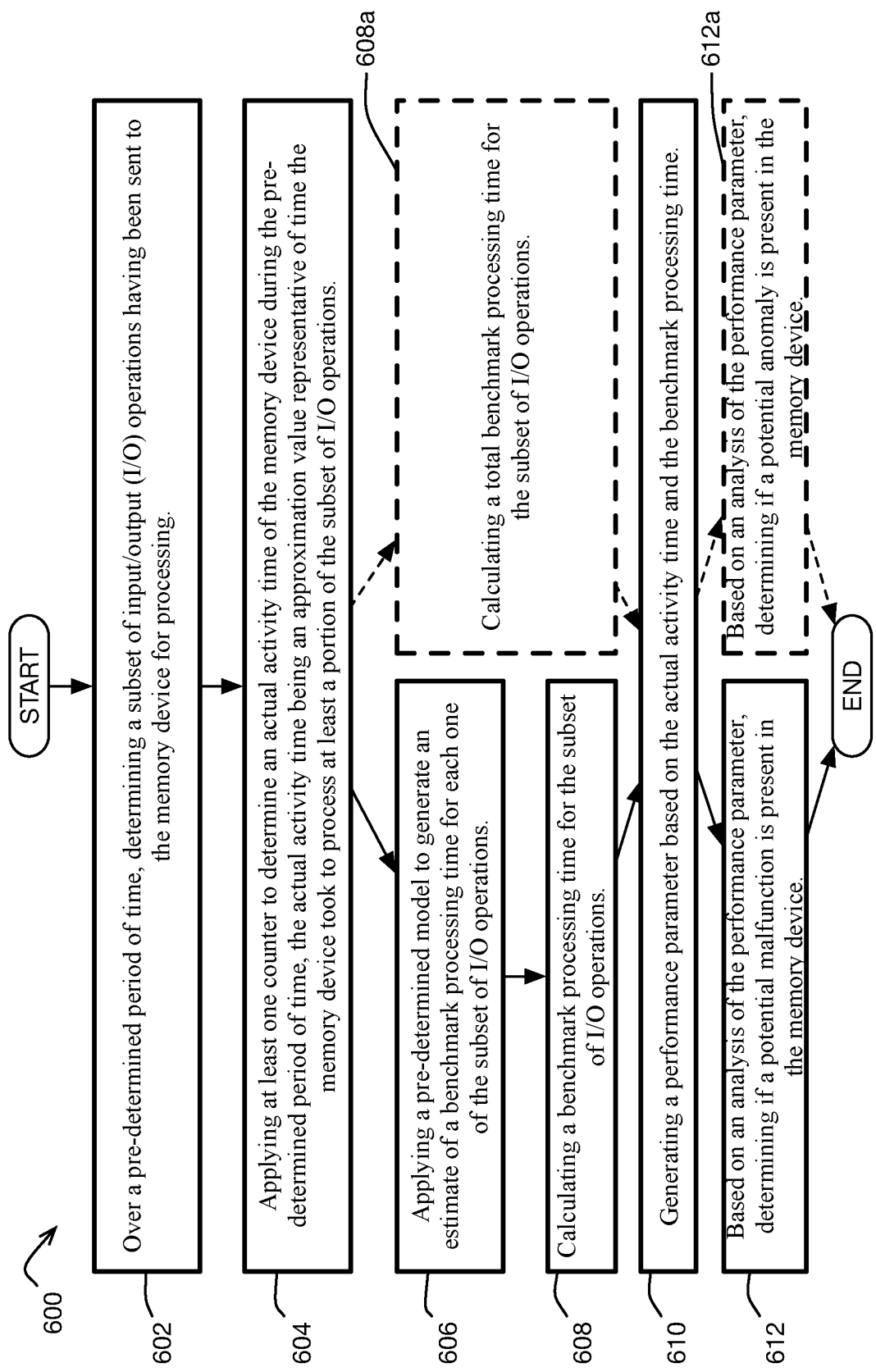
FIG. 6 depicts a block diagram showing a method of determining a potential malfunction or a potential over-performance of the HDD of FIG. 3.

Referring to FIG. 6, over a given pre-determined period of time of the plurality of pre-determined periods of time during which the supervisory entity computer 200 monitors in-use operation of the HDD 201, the supervisory entity computer 200 determines a subset of the I/O operations 212 that have been sent to the HDD 201 for processing.

More particularly, in some non-limiting implementations, the supervisory entity computer 200 determines, for each of the I/O operations 212 sent to the HDD 201 during the given pre-determined period of time, the size (in bytes, or megabytes for example) thereof and the particular sector(s) of the hard disk 206 associated therewith. In some non-limiting implementations, the supervisory entity computer 200 records this information, for example in the one or more data structures 216 described herein above.

Step 604—Applying at Least One Counter to Determine an Actual Activity Time of the Memory Device During the Pre-Determined Period of Time, the Actual Activity Time being an Approximation Value Representative of Time the Memory Device Took to Process at Least a Portion of the Subset of I/O Operations.

In some non-limiting implementations, for the given pre-determined period of time, the supervisory entity computer 200 applies/executes the first counter 202 for counting a number of the I/O operations 212 sent to the HDD 201.

In some non-limiting implementations, for the given pre-determined period of time, the supervisory entity computer 200 also applies/executes the second counter 204 for counting a number of I/O operation-complete confirmations 214 that returned/issued by the HDD 201.

The creators of the present technology have appreciated that time periods, or simply times, during which the value of the first counter 202 is equal to the value of the second counter 204 are indicative of the HDD 201 being idle (i.e. the HDD 201 is not processing any I/O operation).

Figure 13:
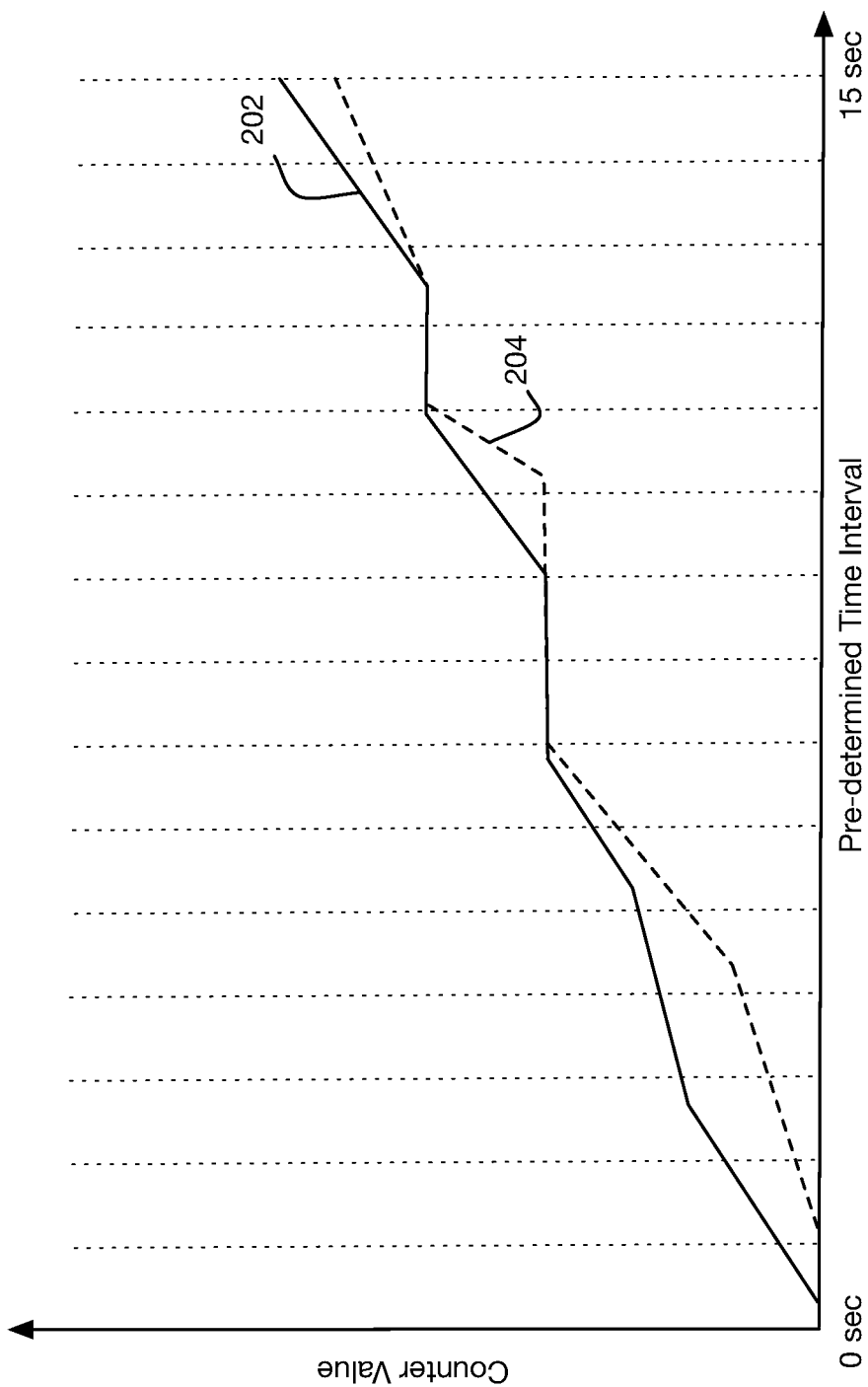
FIG. 13 schematically maps the values of a first counter and the values of a second counter over a pre-determined period of time, the first counter and the second counter being executed by a supervisory entity computer of the distributed computer-processing system with respect to operation of the HDD of FIG. 3.

For the sake of a non-limiting example, FIG. 13 schematically maps the values of the first counter 202 and the second counter 204 over the pre-determined period of time of 15.0 seconds. As shown, the value of the first counter 202 was equal to the value of the second counter 204 during approximately the time interval between 7.0 and 9.0 seconds for a total of 2.0 seconds, and during approximately the time interval between 11.1 seconds and 12.6 seconds for a total of 1.5 seconds. Therefore, in this example the HDD 201 is considered to have been idle (i.e. not processing any I/O operation) during these two timeframes, for a total of 3.5 seconds of the 15.0 seconds.

Accordingly, in some non-limiting implementations, the supervisory entity computer 200 is configured to determine, and determines, an actual activity time of the HDD 201 by: determining a total idle time of the HDD 201 by adding up all time intervals in the pre-determined period of time when a value of the first counter 202 and a value of the second counter are the same, and subtracting the total idle time from the pre-determined period of time. Thus, in the non-limiting example of FIG. 13, the actual activity time of the HDD 201 is determined to be 15.0 seconds−3.5 seconds=11.5 seconds.

Step 606—Applying a Pre-Determined Model to Generate an Estimate of a Benchmark Processing Time for Each One of the Subset of the I/O Operations.

The supervisory entity computer 200 applies the pre-determined model described herein above to generate an estimate of a benchmark processing time for the subset of the I/O operations 212 sent to the HDD 201 during the pre-determined period of time.

In some non-limiting implementations of the pre-determined model, at step 606 of the method 600, the supervisory entity computer 200 inputs into the pre-determined model, the sizes and destination sector(s) associated with the subset of I/O operations 212 sent to the HDD 201 determined to have been sent to the HDD 201 during the pre-determined period of time.

In response, the pre-determined model returns an estimate of a benchmark processing time for each one of the subset of the I/O operations 212, by using portions of the pre-determined model corresponding to the write speed algorithm and/or the read speed algorithm, depending on the particular combination of read operations and/or write operations that are contained in the subset of the I/O operations 212.

More particularly, in some non-limiting implementations, for each sequential one of the subset of I/O operations, the pre-determined model determines an execution time for the sequential one of the subset of I/O operations based on the size of the sequential one of the subset of I/O operations and the pre-determined speed of execution of the type of the sequential one of the subset of I/O operations.

Even more particularly, the size and destination sector(s) of each of the read operations (if any) of the subset of the I/O operations 212 are provided as input to the read speed algorithm, with the read speed algorithm outputting an estimate of a benchmark processing time for that one of the read operations.

Similarly, the size and destination sector(s) of each of the write operations (if any) of the subset of the I/O operations 212 are provided as input to the write speed algorithm, with the write speed algorithm outputting an estimate of a benchmark processing time for that one of the write operations.

Further, in some non-limiting implementations, for each sequential one of the subset of I/O operations 212, the pre-determined model determines if execution of the sequential one of the subset of I/O operations 212 requires a full-cycle re-positioning of the writing head/R/W head 210 of the HDD 201 from a position where a previous one of the subset of I/O operations 212 terminated being executed.

More particularly, this is done by inputting the size and destination sector(s) of each sequential pair of the subset of I/O operations 212 into the full-cycle re-positioning determination algorithm as input, with the full-cycle re-positioning determination algorithm returning an indication of whether or not the sequential (second) one of the pair of the subset of I/O operations 212 requires a full-cycle re-positioning of the corresponding writing head/R/W head 210 of the HDD 201.

If full-cycle re-positioning is required, the full-cycle re-positioning time pre-determined for the benchmark HDD 400 is added to the execution time of the sequential one of the subset of I/O operations 212 to derive the benchmark processing time for that sequential one of the subset of I/O operations 212.

Step 608—Calculating a Benchmark Processing Time for the Subset of the I/O Operations.

In such non-limiting implementations, at step 608, the supervisory entity computer 200 sums up the benchmark processing times of each of the read operations and the benchmark processing time of each one of the write operations of the subset of the I/O operations 212 determined at step 606 to derive a benchmark processing time for the subset of the I/O operations 212.

Step 608a—Calculating a Benchmark Processing Time for the Subset of the I/O Operations.

In some non-limiting implementations, the steps 606 and 608 are replaced with a single alternative step 608a. In such non-limiting implementations, the pre-determined model is constructed to receive as input the abovementioned data associated with the subset of I/O operations 212 and to output the benchmark processing time for the subset of I/O operations 212.

Step 610—Generating a Performance Parameter Based on the Actual Activity Time and the Benchmark Processing Time.

Once the benchmark processing time for the subset of I/O operations 212 is determined/estimated, the method 600 proceeds to step 610 at which step the supervisory entity computer 200 generates a performance parameter based on the actual activity time of the HDD 201 and the benchmark processing time determined for the subset of I/O operations 212.

In the present non-limiting implementation, the performance parameter is a ratio of the actual activity time of the HDD 201 associated with the subset of I/O operations 212 to the benchmark processing time associated with the subset of the I/O operations 212. More particularly, the supervisory entity computer 200 divides the actual activity time by the benchmark processing time to determine the ratio.

It is contemplated that in other non-limiting implementations, a different performance parameter could be used.

Step 612—Based on an Analysis of the Performance Parameter, Determining if a Potential Malfunction is Present in the Memory Device.

At step 612 of the method 600, the supervisory entity computer 200 analyzes the performance parameter, in the present non-limiting implementation the performance parameter being the ratio, and based on this analysis determines if a potential malfunction is present in the HDD 201.

In the present non-limiting implementation, the supervisory entity computer 200 compares the performance parameter to a threshold value, and responsive to the performance parameter being above the threshold value, determines that a potential malfunction is present in the HDD 201.

In some cases, the potential malfunction could be indicative of a deterioration of the HDD 201. In some cases, the potential malfunction could be indicative of a compromised reliability of the HDD 201.

In the present non-limiting implementation, the threshold value is 1 (one). It is contemplated that in implementations where a different performance parameter is used, a different corresponding analysis thereof and/or a different threshold value could be used.

Step 612a—Based on an Analysis of the Performance Parameter, Determining if a Potential Anomaly is Present in the Memory Device.

Additionally to and/or in an alternative to step 612 where malfunction was determined, the method 600 may include, at step 612a, the supervisory entity computer 200 analyzing the performance parameter, in the present non-limiting implementation the performance parameter being the ratio, and based on this analysis determines if a potential anomaly is present in the HDD 201.

In some non-limiting implementations, the supervisory entity computer 200 also compares the performance parameter to the threshold value, and responsive to the performance parameter being below the threshold value, determines that a potential over-performance of the HDD 201 is present.

It will be appreciated that the potential malfunction and the potential over-performance are examples of a potential anomaly associated with the HDD 201.

HDD Monitoring

In some non-limiting implementations, the supervisory entity computer 200 monitors the HDD 201 and records the resulting data, as described herein above, with respect to the operation of the HDD 201 in the one or more data structures 216 described herein above, or in other logs or data structures, in or near real-time during operation of the HDD 201. In some non-limiting implementations, the supervisory entity computer 200 monitors the HDD 201 and records the monitored data continuously, 24 hours per day, every day of a given year.

In some non-limiting implementations, the supervisory entity computer 200 generates the performance parameter for the HDD 201 with respect to each of the plurality of pre-determined periods of time over which the supervisory entity computer 200 monitors operation of the HDD 201. In one particular non-limiting example, the plurality of pre-determined periods of time are sequential and are used to monitor operation of the HDD 201 twenty four hours per day, each day of each year.

In some non-limiting implementations, the supervisory entity computer 200 records the performance parameters for the HDD 201 in the one or more data structures 216 described herein above, or in other logs or data structures, with respect to each of the plurality of pre-determined periods of time.

In some non-limiting implementations, the supervisory entity computer 200 graphs the performance parameters for the HDD 201 with respect to the plurality of pre-determined periods of time in a time series graph.

Figure 7:
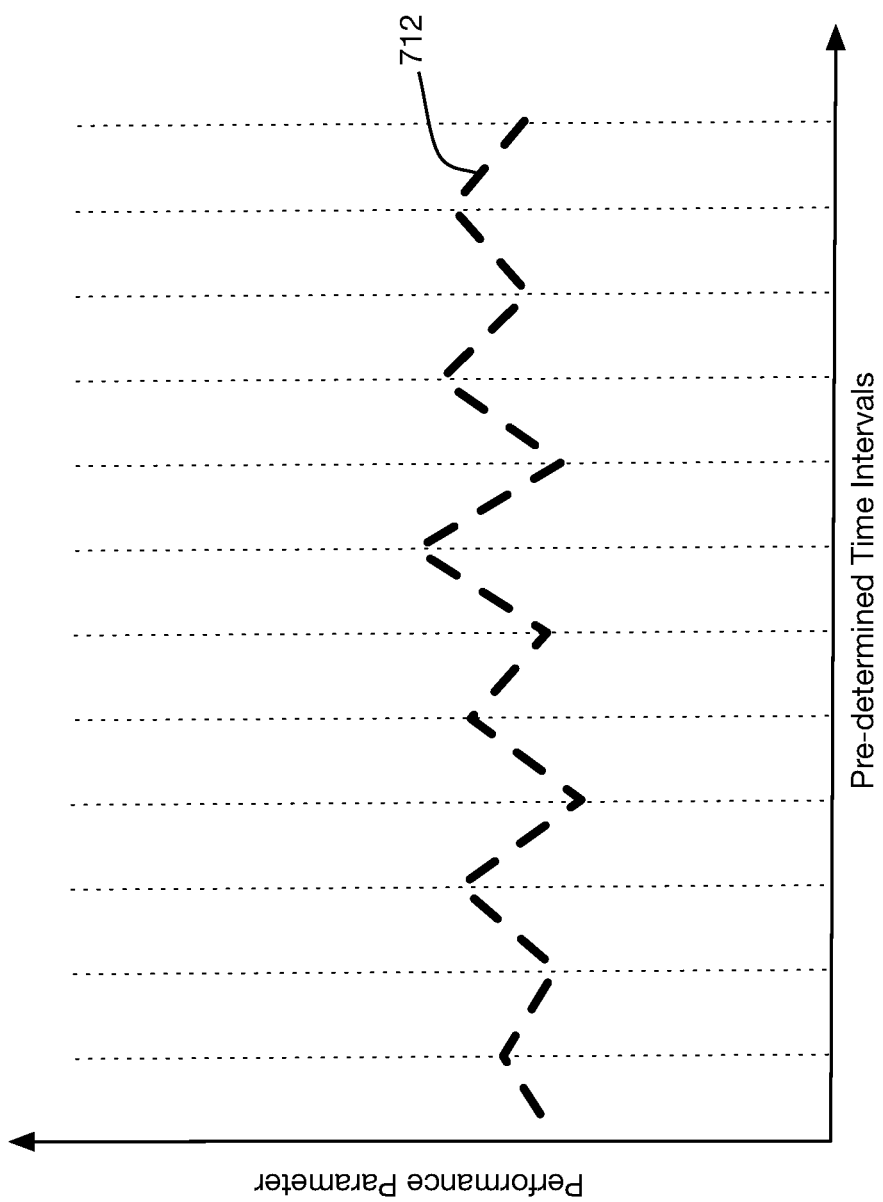
FIG. 7 depicts a time series graph of performance parameters determined based on performance of the HDD of FIG. 3 over a particular set of periods of time.

An example of such a time series graph is shown in FIG. 7, with respect to a given subset of the plurality of pre-determined periods of time. Each given subset of the plurality of pre-determined periods of time may be defined by a user of the supervisory entity computer 200, such as a system administrator for example.

In the example of FIG. 7, a given twenty four hour period of operation of the HDD 201 on a given date (selected by a system administrator) has been broken down into a given number of sequential pre-determined periods of time, such as sequential fifteen second intervals, and graphed in the time series graph 712.

In some non-limiting implementations, the time series graph 712 enables a user, such as the system administrator, a physical state of the HDD 201 over a given number of pre-determined periods of time (which could be selected by a user or otherwise defined). In some non-limiting implementations, such as the implementation described herein below with regard to FIG. 12, performance of multiple HDDs and/or other devices can be plotted together on the same graph.

In some non-limiting implementations, either additionally or alternatively, the supervisory entity computer 200 generates an alert or other notification with respect to the HDD 201 when the performance parameter associated therewith exceeds a given threshold value.

In some non-limiting implementations, the supervisory entity computer 200 is configured to generate the alert/notification in response to a single instance of the performance parameter exceeding of the given threshold value.

In some non-limiting implementations, the supervisory entity computer 200 is configured to generate the alert/notification in response to a pre-defined number of instances of the performance parameter exceeding of the given threshold value.

In some non-limiting implementations, the supervisory entity computer 200 is configured to generate the alert/notification in response to a pre-defined number of instances of the performance parameter exceeding of the given threshold value (or a pre-determined combination of threshold values in some non-limiting implementations), the pre-defined number of instances having occurred in a pre-defined span of time and/or at a pre-defined threshold frequency.

Diagnostic Methods: Solid State Drive Implementations

Some non-limiting implementations of the method 600 of determining a potential malfunction and/or a potential anomaly such as over-performance of a memory device, which method 600 has been described herein above with regard to the HDD 201, can also be implemented with regard to other types of memory devices, such as the SSD 801 of another one of the storage devices 112 of the distributed storage sub-system 108. The SSD 801 is shown schematically in FIG. 8.

As it will become clear from the description herein below, the methods of the present technology of monitoring the performance of the SSD 801 allow for the monitoring to be executed in real-time while the SSD 801 is being used, or at some point after each given period of use of the SSD 801.

For the sake of an example only, the SSD 801 in some non-limiting implementations is a Barracuda™ 2-terabyte (TB) Serial Advanced Technology Attachment III (SATA III) 2.5-inch solid state drive, manufactured by Seagate Technology Company, having a model number STGS2000401.

This particular SSD 801 has a specified maximum sustained read speed of 560 MB/s and a specified maximum sustained write speed of 540 MB/s. In other implementations, the SSD 801 has different part numbers and/or model numbers and/or performance levels.

Figure 8:
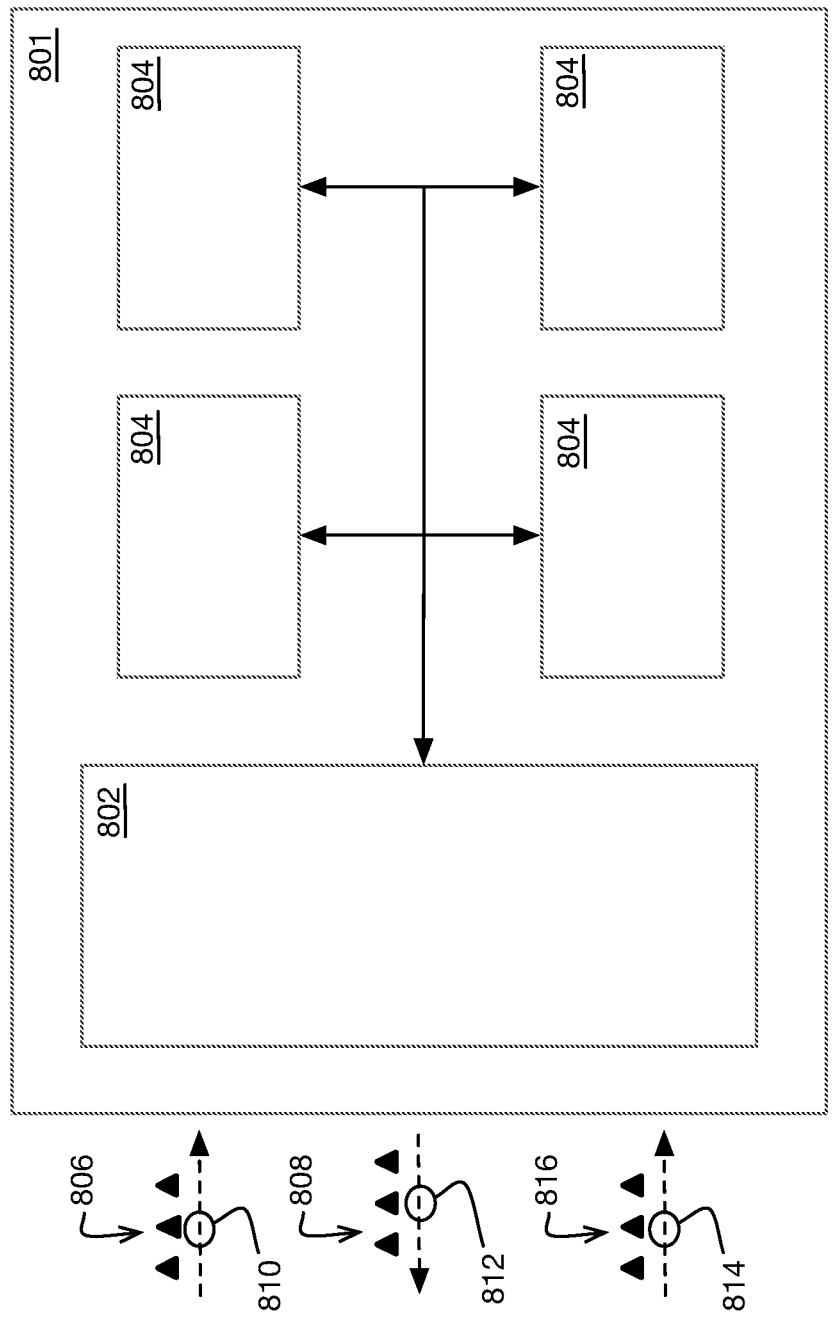
FIG. 8 depicts a schematic diagram of an SSD of the storage device of the distributed computer-processing system of FIG. 2.

As schematically shown in FIG. 8, the present example of the SSD 801 has a controller 802 and a plurality of memory chips 804 communicatively coupled to the controller 802.

In use, the SSD 801 receives I/O operations, such as read operations and write operations, shown as triangles 806, from the Vdrive application 114, via corresponding components of the distributed computer-processing system 100 described above, for processing. More particularly, the I/O operations 806 are received at the controller 802 of the SSD 801, which then distributes the I/O operations 806 to select ones of the memory chips 804 for processing/execution.

For each processed/executed I/O operation 806, the SSD 801, and more particularly the controller 802 thereof, returns/issues a confirmation that the SSD 801 has completed/processed the I/O operation 806. These confirmations may be referred to as I/O operation-complete confirmations and are shown as triangles 808. In some non-limiting implementations, the I/O operation-complete confirmations 808 are received by the request source 102 (and/or by the Vdrive application 114), via corresponding components of the distributed computer-processing system 100 described above, for various uses by the request source 102 (and/or by the Vdrive application 114).

The supervisory entity computer 200 monitors the I/O operations 806 being sent to the SSD 801 and the I/O operation-complete confirmations 808 being returned by the SSD 801, similar to the HDD 201, 400 implementations.

In some non-limiting implementations, the supervisory entity computer 200 executes the monitoring over a plurality of pre-determined periods of time, such as over pre-determined periods of 15 seconds for example. In some non-limiting implementations, the pre-determined periods of time are spaced out over pre-determined intervals of time during a day. For example, in some non-limiting implementations, the supervisory entity computer 200 executes the monitoring over consecutive pre-determined periods of 15 seconds of each 24 hours of each day, continuously. In some non-limiting implementations, this monitoring may be executed over the same time periods as for other monitored device(s), such as the HDD 201 described herein above.

In some non-limiting implementations, for the monitoring, the supervisory entity computer 200 executes a first counter 810 that monitors I/O operations 806 that have been sent to the SSD 801 for processing, and a second counter 812 that monitors the I/O operation-complete confirmations 808 that have been returned/issued by the SSD 801. These aspects are similar to the HDD 201, 400 implementations described herein above.

Figure 9:
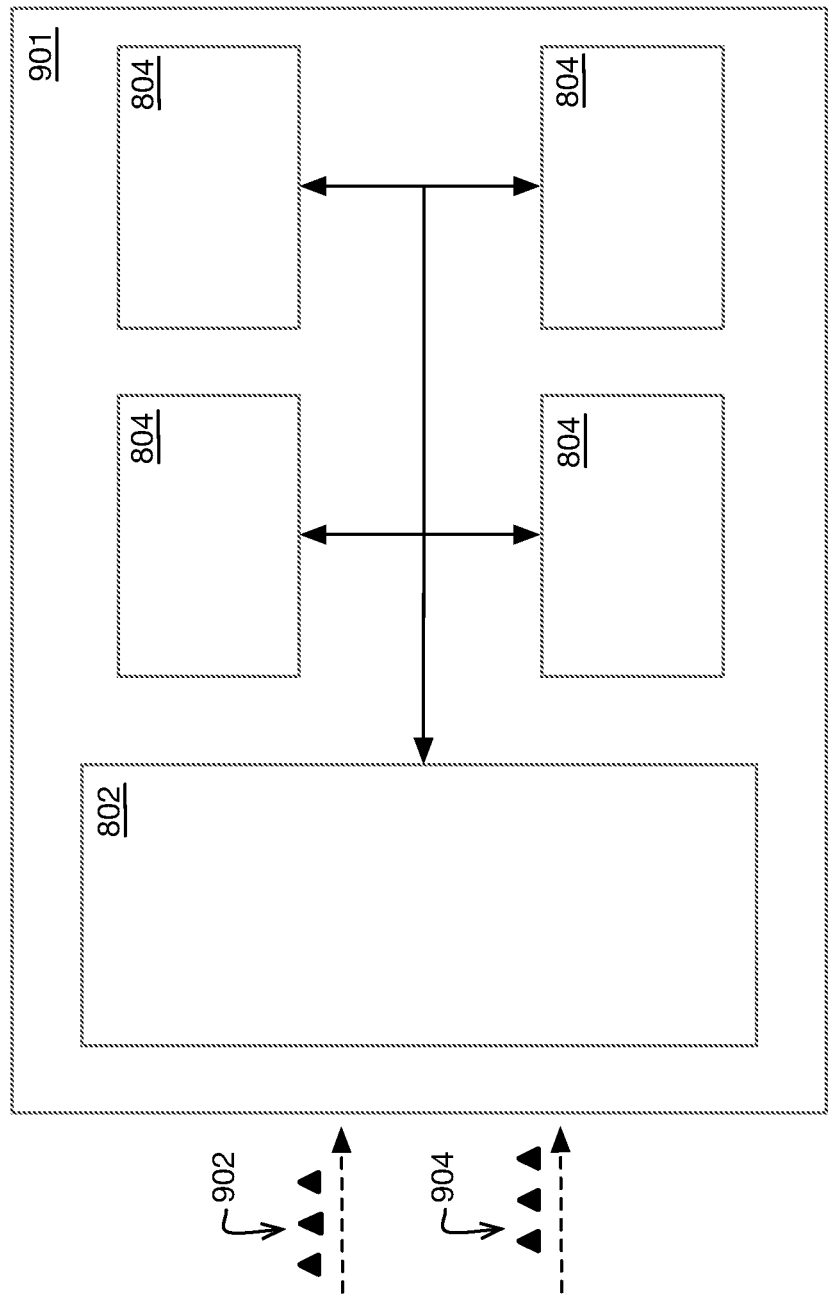
FIG. 9 depicts a schematic diagram of a benchmark SSD, the benchmark SSD having one and the same model number as the SSD of FIG. 8.

Referring to FIG. 9 now, a benchmark SSD 901 is shown. The benchmark SSD 901 is the same as the SSD 801 and is used as a baseline with respect to which in-use operation of the SSD 801 is analyzed to determine/detect potential malfunctions or potential over-performance of the SSD 801, similar to how the HDD 400 was used herein above to determine performance of the HDD 201.

SSD: Method of Constructing Predictive Model

A non-limiting implementation of a method 1000 of constructing the predictive model is described next, with respect to FIG. 10.

Step 1002—Clearing and Trimming the Benchmark SSD.

Figure 10:
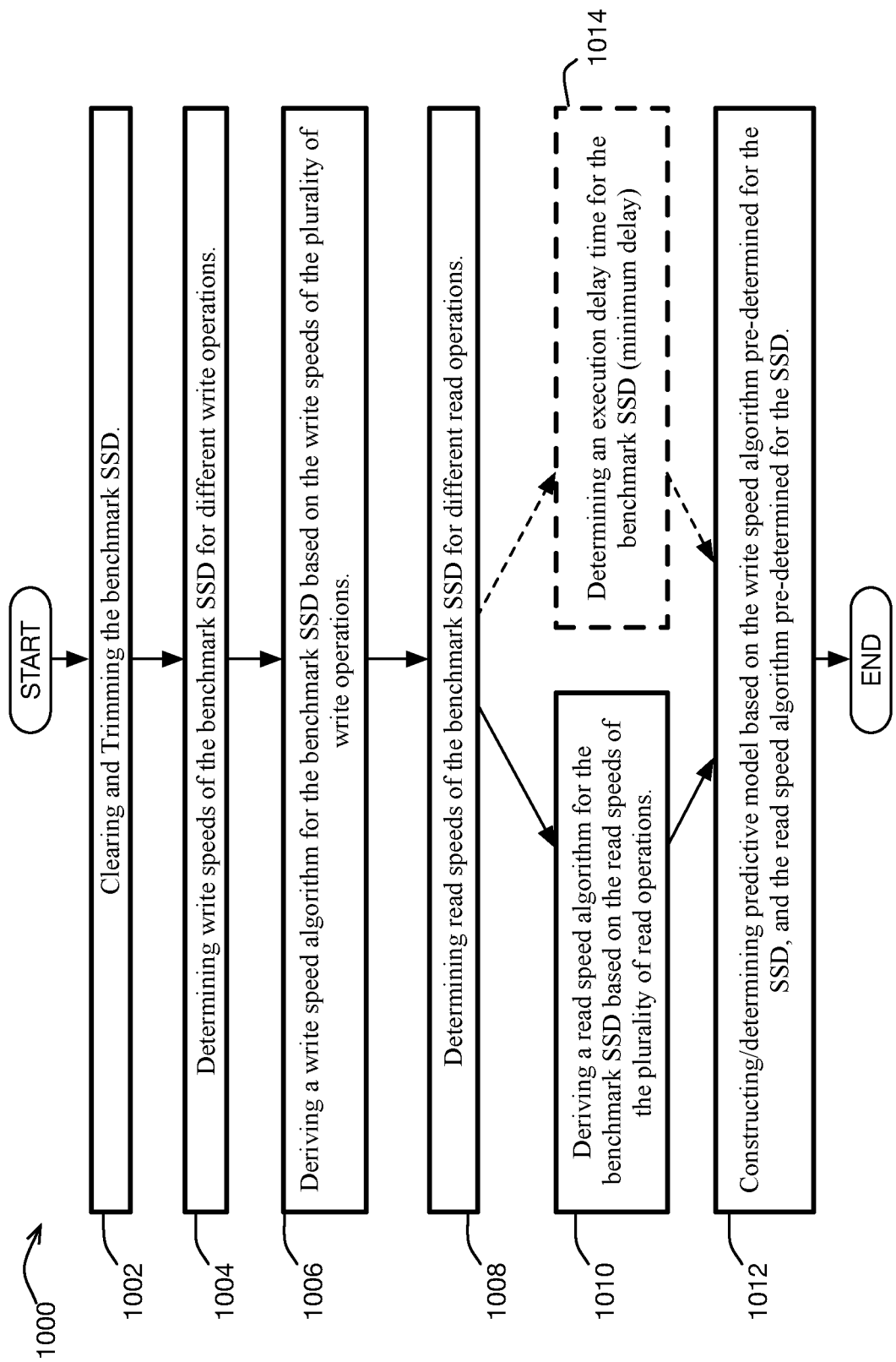
FIG. 10 depicts a block diagram showing a method of generating the predictive model for the benchmark SSD of FIG. 9.

As shown in FIG. 10, the method 1000 of constructing the predictive model starts at step 1002, at which step an entirety of the benchmark SSD 901 is cleared, by an operation such as formatting, and trimmed. Trim is a conventionally known command used with respect to SSDs and therefore will not be described herein in more detail.

Step 1004—Determining Write Speeds of the Benchmark SSD for Different Write Operations.

At step 1004, a plurality of write operations 902 of one or more particular sizes (measured in bytes for example), shown as triangles in FIG. 9, are sent to the benchmark SSD 901 to be processed/executed thereby.

Referring briefly to FIG. 9, the benchmark SSD 901 processes/executes the plurality of write operations 902, and a write speed of the benchmark SSD 901 is derived/measured for each of the plurality of write operations 902.

In some non-limiting implementations, the resulting data is stored in one or more of the data structures 216 (FIG. 1) for example, for deriving/constructing a write speed algorithm therefrom.

Step 1006—Deriving a Write Speed Algorithm for the Benchmark SSD Based on the Write Speeds of the Plurality of Write Operations.

Referring back to FIG. 10, at step 1006, a write speed algorithm is derived based on the determined write speeds of the plurality of write operations 902, using suitable mathematical/empirical techniques.

In some non-limiting implementations, a linear function is used with the logged write speed data points to correlate the size of a given read operation to the write speed at which the given read operation is, or will be, executed (i.e. execution speed of the given write operation).

In some non-limiting implementations, one or more non-linear functions are used with the logged write speed data points to correlate the size of a given read operation to the write speed at which the given read operation is, or will be, executed (i.e. execution speed of the given write operation).

In some non-limiting implementations, additional functions and variables are added into the write speed algorithm to account for the particular memory chip 804 that the given write operation is to be executed on and or the particular superblock(s) in the particular memory chip 804 that the given write operation is to be executed on.

Accordingly, in some non-limiting implementations, the write speed algorithm determines/predicts the write speed of the benchmark SSD 901 based on the particular sizes of the write operations sent thereto in use for processing.

In some non-limiting implementations, the write speed algorithm determines/predicts the write speed of the benchmark SSD 901 further based on the particular memory chip 804 that the given write operations are to be executed on and or the particular superblock(s) in the particular memory chip 804 that the given write operations are to be executed on.

Step 1008—Determining Read Speeds of the Benchmark SSD for Different Read Operations.

At step 1008, a plurality of read operations 904 of one or more particular sizes (measured in bytes for example) (i.e. requests therefor), shown as triangles in FIG. 9, are sent to the benchmark SSD 901 to be processed/executed thereby.

The benchmark SSD 901 processes/executes the plurality of read operations 904, and a read speed of the benchmark SSD 901 is derived/measured for each of the plurality of read operations 904.

In some non-limiting implementations, the resulting data is stored in one or more of the data structures 216 for example, for deriving/constructing a read speed algorithm therefrom.

Step 1010—Deriving a Read Speed Algorithm for the Benchmark SSD Based on the Read Speeds of the Plurality of Read Operations.

At step 1010, a read speed algorithm is derived based on the determined read speeds of the plurality of read operations 904, using suitable mathematical/empirical techniques.

In some non-limiting implementations, a linear function is used with the logged read speed data points to correlate a size of a given read operation to a read speed at which the given read operation is, or will be, executed (i.e. execution speed of the given read operation).

In some non-limiting implementations, one or more non-linear functions are used with the logged read speed data points to correlate a size of a given read operation to a read speed at which the given read operation is, or will be, executed (i.e. execution speed of the given read operation).

In some non-limiting implementations, additional functions and variables are added into the read speed algorithm to account for the particular memory chip 804 that the given read operation is stored on and or the particular superblock(s) in the particular memory chip 804 that the given read operation is stored in.

Accordingly, in some non-limiting implementations, the read speed algorithm determines/predicts the read speed of the benchmark SSD 901 based on the particular sizes of the read operations sent thereto in use for processing.

In some non-limiting implementations, the read speed algorithm determines/predicts the read speed of the benchmark SSD 901 further based on the particular memory chip 804 that the given read operations are to be executed on and or the particular superblock(s) in the particular memory chip 804 that the given read operations are to be executed on.

Step 1012—Constructing/Determining Predictive Model Based on the Write Speed Algorithm Pre-Determined for the SSD, and the Read Speed Algorithm Pre-Determined for the SSD.

At step 1012, a predictive model is constructed/determined based on the write speed algorithm and the read speed algorithm. That is, in some non-limiting implementations, the predictive model comprises at least some from of or a derivation of the write speed algorithm and the read speed algorithm. It is contemplated that other methods and/or other constructions of the predictive model could be used.

The resulting predictive model (i.e. the pre-determined model) generates, for a given subset of I/O operations processed and/or to be processed by the benchmark SSD 901, or the SSD 801, a benchmark processing time associated with that given subset of I/O operations.

To do so, the given subset of I/O operations are inputted into the predictive model, with the predictive model outputting the benchmark processing time representative of the time that the benchmark SSD 901, or the SSD 801, would take, or should have taken, to process/complete the given subset of I/O operations when the benchmark SSD 901, or the SSD 801, is in the "ideal" or otherwise desirable physical state.

As seen from the various steps of the method 1000 described herein above, the predictive model takes into account the actual operating conditions of the benchmark SSD 901 and the SSD 801. As described above, operating conditions include the size, type, and in some non-limiting implementations also the location(s) associated with the particular I/O operations to be executed.

It is contemplated that the predictive model could be constructed/pre-determined based on the benchmark SSD 901 using a different method and could take into account a set of constants, variables, and functions that is different from the set those described herein above.

While the predictive model of the present implementation does not predict or take into account the TRIM time that could be associated with operation of the benchmark SSD 901, it is contemplated that the predictive model could be constructed to do so.

Step 1014—Determining an Execution Delay Time (Minimum Delay) for the Benchmark SSD In some non-limiting implementations, in an optional step 1014, an execution delay time (minimum delay) is determined for the benchmark SSD 901 either by measurement thereof or from manufacturer provided specifications for the benchmark SSD 901.

The execution delay time is a time between the receipt by the controller 802 of the benchmark SSD 901 of an I/O operation and the start of processing that I/O operation by the benchmark SSD 901.

In some non-limiting implementations, the execution delay time of the benchmark SSD 901 is factored into the predictive model for calculating benchmark processing times for I/O operations to be executed by the benchmark SSD 901.

SSD: Method of Determining Potential Malfunction/Over-Performance

The method 600 of determining a potential malfunction of a memory device described herein above and shown in a block diagram in FIG. 6, which was applied to the HDD 201, may also be applied to the SSD 801 in a similar way as with respect to the HDD 201.

Referring to FIG. 6, one difference with regard to the method 600 being applied to the SSD 801 may be at step 604. More particularly, in some non-limiting implementations where trim operations executed by the SSD 801 may affect the read/write performance thereof, in addition to applying the first counter 810 and the second counter 812, the supervisory entity computer 200 additionally applies/executes a third counter 814 which counts trim commands 816 sent to the SSD 801 and respective execution times thereof by the SSD 801.

In some such non-limiting implementations, the supervisory entity computer 200 is configured to determine, and determines, an actual activity time of the SSD 801 for executing the subset of I/O operations 806 by: determining a total idle time of the SSD 801 by adding up all time intervals in the pre-determined period of time when a value of the first counter 810 and a value of the second counter 812 are the same, then subtracting from all said time intervals all sub-intervals of time when the third counter 814 was indicative of trim operations being performed by the SSD 801 to derive the effective idle time of the SSD 801, and then subtracting the effective idle time from the pre-determined period of time.

Still referring to FIG. 6, another difference with regard to the method 600 being applied to the SSD 801 may be at step 608. More particularly, in some non-limiting implementations, the sum of all of the sub-intervals of time during the pre-determined period of time when the third counter 814 was indicative of trim operations being performed by the SSD 801 is added to the benchmark processing time calculated by the pre-determined model for the SSD 801 before generating the performance parameter at step 610.

In other words, in some non-limiting implementations, the method 600 when applied to the SSD 801 accounts for the time of the trim operations executed by the SSD 801 during the pre-determined period of time with respect to which the method 600 is executed.

SSD Monitoring

In some non-limiting implementations, the supervisory entity computer 200 monitors the SSD 801 and records the resulting data, in a similar way as described herein above with respect to the HDD 201.

Figure 11:
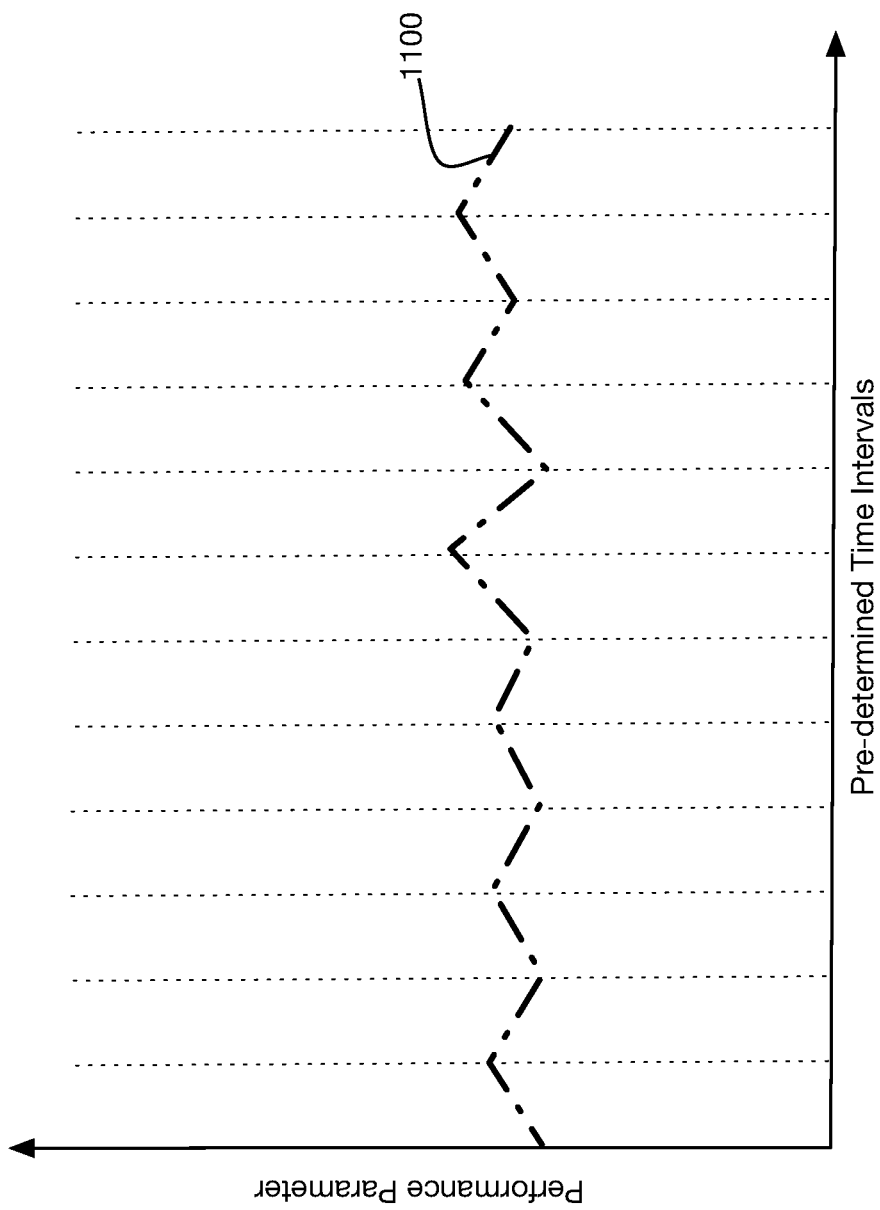
FIG. 11 depicts a time series graph of performance parameters determined based on performance of the SSD of FIG. 8 over a particular set of periods of time.

An example of a resulting time series graph 1100 is shown in FIG. 11, with respect to a given subset of the plurality of pre-determined periods of time during which the SSD 801 operated and was monitored.

Global Monitoring System

In some non-limiting implementations, the supervisory entity computer 200 executes the method 600 with respect to each of a plurality of memory devices for determining when an anomaly in in-use operation is present in any one or more of the plurality of memory devices.

In some non-limiting implementations, the supervisory entity computer 200 executes the method 600 with respect to each memory device of each of the storage devices 112 of the distributed storage sub-system 108.

In some non-limiting implementations, the supervisory entity computer 200 records the resulting performance data and performance parameters associated with each monitored memory device in the one or more data structures 216, or in other suitable data structures.

In some non-limiting implementations, the supervisory entity computer 200 is configured to allow a user, such as a system administrator, to graph the performance of any one or more of the monitored memory devices on a single graph over a time frame defined by the user. One example of such a graph is shown in FIG. 12.

Figure 12:
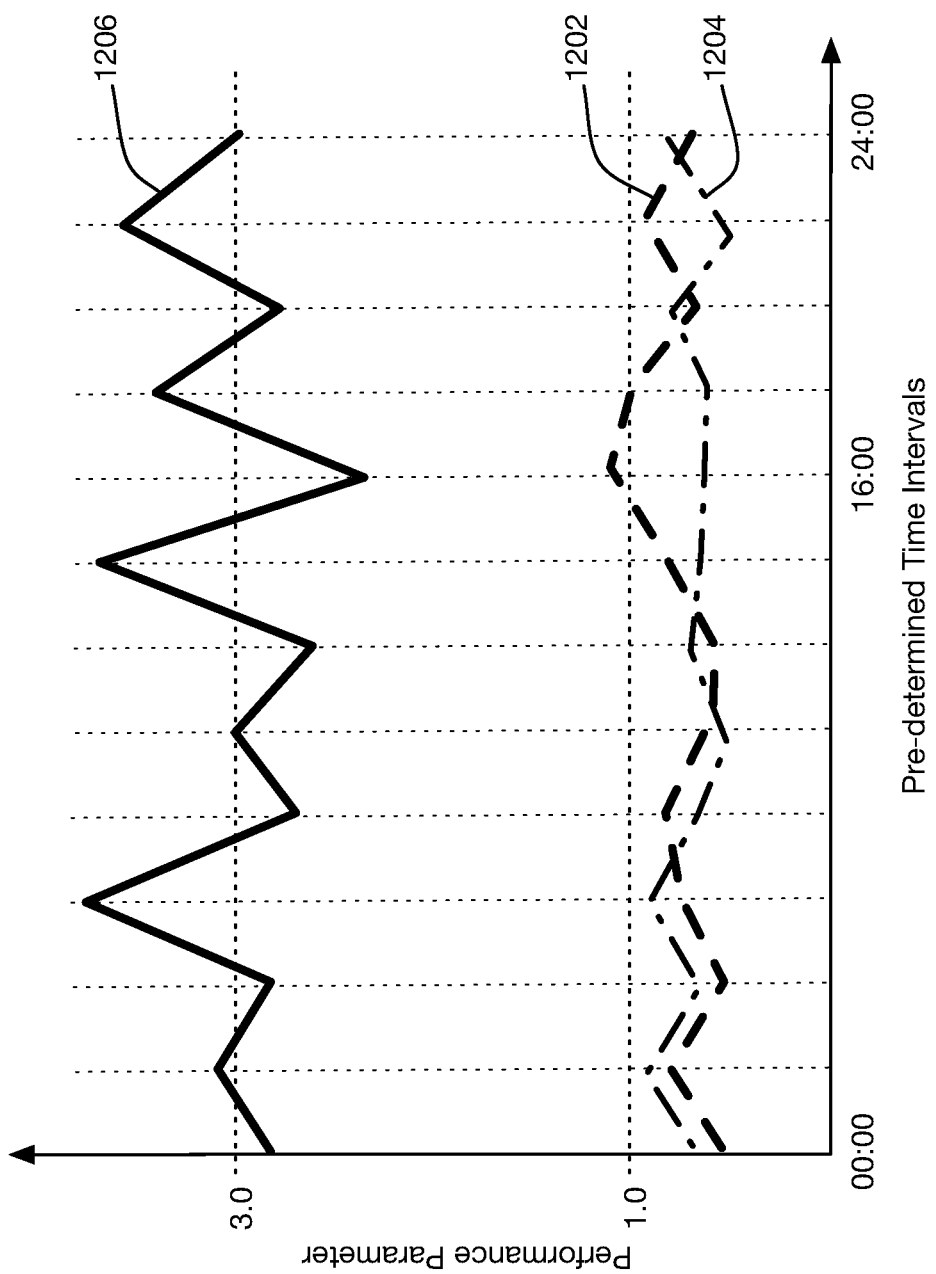
FIG. 12 depicts a time series graph of performance parameters determined based on performance of the HDD of FIG. 3, the SSD of FIG. 8, and another memory device of the distributed computer-processing system of FIG. 1, over a particular set of periods of time.

In the non-limiting example of FIG. 12, the supervisory entity computer 200 has generated (using respective application of the method 600) and plotted, for a given 24 hour period on a given day, performance parameters generated from operation of the HDD 201 with time series graph 1202, performance parameters generated from operation of the SSD 801 with time series graph 1204, and performance parameters generated from operation of a memory device 128 (FIG. 1) with time series graph 1206, the memory device 128 being another one of the storage devices 112 of the distributed storage sub-system 108.

As seen from this example, the HDD 201 and the SSD 801 have operated close to the benchmark 1.0 ratio, with the HDD 201 experiencing a potential malfunction during a certain time period around 16:00 on that day. As seen from the time series graph 1202, during that time period around 16:00, the performance parameters generated for the HDD 201 exceeded the threshold value of 1.0, while at all other times in the given 24 hour period the performance parameters generated for the HDD 201 were below the threshold value of 1.0.

As seen from the time series graph 1204 associated with the SSD 801, the performance parameters generated for the SSD 801 were below the threshold value of 1.0 at all other times in the given 24 hour period, indicating a potential over-performance of the SSD 801 in relation to the benchmark SSD 901.

As seen from the time series graph 1206 associated with the memory device 128, on the other hand, the performance parameters generated for the memory device 128 oscillated at around a performance parameter of 3.0. This is a relatively strong indication of a potential performance malfunction present in the memory device 128.

For example, in some non-limiting implementations, the performance parameter(s) for a given memory device is/are compared to a threshold value that is different from 1.0.

In one particular non-limiting example, the performance parameters for a given memory device is/are compared to a threshold value of 1.2 for determining a potential malfunction of the give memory device. In this example, the added 0.2 represents a "filter" of noise that may occur in operation of the algorithms used in the method 600, which "filter" may help remove false identifications of potential malfunctions.

In another particular non-limiting example, the performance parameters for a given memory device is/are compared to a threshold value of 0.9 for determining a potential over-performance of the give memory device. In this example, the subtracted 0.1 represents a "filter" of noise that may occur in operation of the algorithms used in the method 600, which "filter" may help remove false identifications of potential over-performances.

As yet another particular non-limiting example, in some non-limiting implementations, an average performance parameter of a given one of the memory devices over a given pre-determined time interval may be determined, the given pre-determined time interval comprising a plurality of pre-determined time intervals over which the given memory device was monitored.

For example, referring to FIG. 12, the supervisory entity computer 200 may calculate from the data graphed as the time series graph 1204 associated with the HDD 201, an average performance parameter of the HDD 201 over a time period from 15:45 to 16:30, on the day shown in FIG. 12. In this example, the average performance parameter for this time period may be 1.17.

Thus, according to one monitoring method, the supervisory entity computer 200 may then compare this average performance parameter to a threshold value, which could be 1.20 for example, and determine that since 1.17 is below 1.20, the HDD 201 is in an acceptable physical condition and does not have a potential malfunction.

As yet another particular non-limiting example, in some non-limiting implementations, supervisory entity computer 200 may calculate from the data graphed as the time series graph 1204 associated with the HDD 201 a maximum performance parameter over a given pre-determined time interval, the given pre-determined time interval comprising a plurality of pre-determined time intervals over which the HDD 201 was monitored. In this example, the maximum performance parameter for this time period may be 1.21.

Thus, according to one monitoring method, the supervisory entity computer 200 may compare this maximum performance parameter to a corresponding threshold value, which could be 1.25 for example, and determine that since 1.21 is below 1.25, the HDD 201 is in an acceptable physical condition and does not have a potential malfunction.

In some non-limiting implementations of monitoring methods of the present technology, an average performance parameter monitoring as described herein above is performed in addition to the maximum performance parameter monitoring as described herein above, such that an indication from either of these monitoring sub-methods that a potential malfunction is present causes the supervisory entity computer 200 to generate an indication that potential malfunction is present.

While particular monitoring methods for interpreting the generated performance parameter data were described herein above, it is contemplated that other monitoring methods could also be used in addition, in combination, or in alternative.

While particular orders of methods steps have been set out herein above, it is contemplated that other orders of method steps could be used to carry out the methods described herein.

Modifications and improvements to the above-described implementations of the present technology may become apparent to those skilled in the art. The foregoing description is intended to provide specific non-limiting implementations of the present technology.

The invention claimed is:

1. A method of determining a potential anomaly of a memory device, the memory device being a hard disk drive (HDD) for processing a plurality of I/O operations, the method executable at a supervisory entity computer, the supervisory entity computer being communicatively coupled to the memory device, the method comprising:

over a pre-determined period of time:
determining a subset of input/output (I/O) operations having been sent to the memory device for processing;
applying at least one counter to determine an actual activity time of the memory device during the pre-determined period of time, the actual activity time being an approximation value representative of time the memory device took to process at least a portion of the subset of I/O operations;
applying a pre-determined model to generate an estimate of a benchmark processing time for each one of the subset of I/O operations, the applying the pre-determined model comprising:
based on a size of the sequential one of the subset of I/O operations and a pre-determined speed of execution of a type of the sequential one of the subset of I/O operations, determining an execution time for the sequential one of the subset of I/O operations;
determining if execution of the sequential one of the subset of I/O operations requires a full-cycle re-positioning of a writing head of the memory device from a position where a previous one of the subset of I/O operations terminated being recorded; and
if full-cycle re-positioning is required, adding to the execution time a pre-determined full-cycle re-positioning time to derive the benchmark processing time;
calculating a benchmark processing time for the subset of I/O operations;
generating a performance parameter based on the actual activity time and the benchmark processing time; and
based on an analysis of the performance parameter, determining if the potential anomaly is present in the memory device.

2. The method of claim 1, wherein the pre-determined speed of execution and the pre-determined full-cycle re-positioning time have been pre-determined specifically for one of:
the memory device;
for a type of devices including the memory device.

3. The method of claim 1, the method further comprising building the pre-determined model, the building the pre-determined model for one of:
the memory device;
a type of devices including the memory device.

4. The method of claim 3, wherein the building the pre-determined model comprises:
   determining, for the benchmark memory device, a speed of execution of a plurality of benchmarking I/O operations, the plurality of benchmarking I/O operations including a type associated with the subset of I/O operations having been sent to the memory device, the speed of execution being determined at least at: (i) an outer track and (ii) an inner track of the benchmark memory device;
   determining a speed of rotation of a disk of the benchmark memory device;
   determining a minimum delay required between ceasing executing of one of the plurality of benchmarking I/O operations and starting executing a subsequent one of the plurality of benchmarking I/O operations to enable the benchmark memory device to execute the subsequent one of the plurality of benchmarking I/O operations without requiring a full-cycle re-positioning of a hard disk of the benchmark memory device.

5. The method of claim 4, wherein the building the pre-determined model is executed by sending to the benchmark memory device a pre-determined number the benchmarking I/O operations before putting the benchmark memory device into use.

6. The method of claim 5, wherein the building the pre-determined model further comprises taking into account manufacturer-provided performance characteristics of the benchmark memory device.

7. The method of claim 1, wherein the at least one counter comprises:
   a first counter for counting a number of I/O operations sent to the memory device;
   a second counter for counting a number of I/O operation-complete confirmations received from the memory device.

8. The method of claim 7, wherein the determining the actual activity time comprises:
   determining a total idle time by adding up all time intervals when a value of the first counter and a value of the second counter are the same; and
   subtracting the total idle time from the pre-determined period of time.

9. The method of claim 1, the method further comprises executing the analysis of the performance parameter.

10. The method of claim 9, wherein:
    the analysis comprises comparing the performance parameter to a threshold value of 1 and,
    responsive to the performance parameter being above 1, determining the potential anomaly.

11. The method of claim 9, wherein the memory device is one of a plurality of memory devices and wherein the analysis comprises determining a subset of memory devices that have:
    an average performance parameter over a second pre-determined time interval being above other average performance parameter of other ones of the plurality of memory devices; and
    a maximum performance parameter over the second pre-determined time interval being above other maximum performance parameter of other ones of the plurality of memory devices.

12. The method of claim 9, wherein the performance parameter is a ratio.

13. The method of claim 12, wherein:
    the analysis comprises comparing the performance parameter to a threshold value; and
    responsive to the performance parameter being above the threshold value, determining the potential anomaly.

14. The method of claim 13, wherein the threshold value is 1.

15. The method of claim 9, wherein:
    the analysis comprises comparing the performance parameter to a threshold value; and
    responsive to the performance parameter being below the threshold value, determining the potential anomaly as being present in a form of an over-performance of the memory device.

16. The method of claim 15, wherein the threshold value is 1.

17. The method of claim 1, wherein the at least one counter comprises a single counter that generates an indication of an actual processing time of the at least a portion of the subset of I/O operations.

18. A method of determining a potential anomaly of each one of a plurality of memory devices, at least one device of the plurality of memory devices being an SSD for processing a plurality of I/O operations, the SSD having at least one of a model number and a part number, the method executable at a supervisory entity computer, the supervisory entity computer being communicatively coupled to the plurality of memory devices, the method comprising:
   over a pre-determined period of time:
      determining a subset of input/output (I/O) operations having been sent to the each one of the plurality of memory devices for processing;
      applying at least one counter to determine an actual activity time of the each one of the plurality of memory devices during the pre-determined period of time, the actual activity time being an approximation value representative of time the each one of the plurality of memory devices took to process at least a portion of the subset of I/O operations, the at least one counter including a first counter for monitoring I/O operations sent to the SSD for processing, a second counter for monitoring confirmations of completed I/O operations received from the SSD, and applying the at least one counter including:
         executing the first counter to monitor I/O operations sent to the SSD for processing during the pre-determined period of time,
         executing the second counter to monitor confirmations of completed I/O operations received from the SSD during the pre-determined period of time, and
         determining a total of all time periods within the pre-determined period of time during which a value of the first counter was equal to a value of the second counter;
   applying a pre-determined model to generate an estimate of a benchmark processing time for each one of the subset of I/O operations;
   calculating a benchmark processing time for the subset of I/O operations;
   generating a performance parameter for each one of the plurality of memory devices based on:
      (i) the actual activity time and the benchmark processing time;
      (ii) an SSD minimum delay pre-determined for a benchmark SSD, the benchmark SSD having the at least one of the model number and the part number as the SSD; and based on an analysis of the performance parameter, determining if the potential anomaly is present in the each one of the plurality of memory devices.

19. The method of claim 18, wherein applying the at least one counter to determine the actual activity time of the SSD during the pre-determined period of time further includes subtracting from the pre-determined period of time the total of all time periods during which the value of the first counter was equal to the value of the second counter.

20. The method of claim 19, wherein the pre-determined model is further based on an SSD minimum delay pre-determined for the benchmark SSD.

21. The method of claim 20, wherein the pre-determined model is based on empirical testing of the benchmark SSD.

22. The method of claim 21, wherein the empirical testing includes sending a pre-determined number of benchmarking I/O operations to the benchmark SSD.

23. The method of claim 22, wherein the method further comprises generating the pre-determined model, the generating including: clearing an entirety of the benchmark SSD prior to the empirical testing of the benchmark SSD.

24. The method of claim 18, further comprising building the pre-determined model before the SSD is put into use.

25. The method of claim 24, wherein the building the pre-determined model comprises taking into account manufacturer-provided performance characteristics of the benchmark SSD.

26. The method of claim 18, further comprising executing the analysis of the performance parameter.

27. The method of claim 26, wherein:
the analysis comprises comparing the performance parameter to a threshold value; and
responsive to the performance parameter being above the threshold value, determining the potential anomaly as being present in a form of a potential malfunction of the SSD.

28. The method of claim 18, wherein the SSD is one of a plurality of memory devices and wherein the analysis comprises determining a subset of the memory devices that have:
an average performance parameter over a second pre-determined time interval being above other average performance parameter of other ones of the plurality of memory devices; and
a maximum performance parameter over the second pre-determined time interval being above other maximum performance parameter of other ones of the plurality of memory devices.

29. The method of claim 18, wherein:
the analysis comprises comparing the performance parameter to a threshold value; and
responsive to the performance parameter being below the threshold value, determining the potential anomaly as being present in a form of an over-performance of the SSD.

30. The method of claim 18, wherein the applying the pre-determined model comprises, for a given one of the subset of I/O operations:
based on a size of the given one of the subset of I/O operations and a pre-determined speed of execution of the given one of the subset of I/O operations, determining an execution time of the given one of the subset of I/O operations; and
determining a total execution time for the subset of I/O operations based on the execution time of each given one of the subset of I/O operations.

31. A method of detecting a potential anomaly in in-use performance of a memory device, the memory device being a hard disk drive (HDD), the method executable at a supervisory entity computer, the supervisory entity computer being communicatively coupled to the memory device, the method comprising:
over a pre-determined period of time:
determining a subset of input/output (I/O) operations having been sent to the memory device for processing;
applying at least one counter to determine an actual activity time of the memory device during the pre-determined period of time, the actual activity time being representative of time the memory device took to process at least some of the subset of I/O operations;
applying a pre-determined model to generate a benchmark processing time for the at least some of the subset of I/O operations, the applying the pre-determined model comprising:
based on a size of the sequential one of the subset of I/O operations and a pre-determined speed of execution of a type of the sequential one of the subset of I/O operations, determining an execution time for the sequential one of the subset of I/O operations;
determining if execution of the sequential one of the subset of I/O operations requires a full-cycle re-positioning of a writing head of the memory device from a position where a previous one of the subset of I/O operations terminated being recorded; and
if full-cycle re-positioning is required, adding to the execution time a pre-determined full-cycle re-positioning time to derive the benchmark processing time;
calculating a benchmark processing time for the at least some of the subset of I/O operations;
generating a performance parameter based on the actual activity time and the benchmark processing time;
based on an analysis of the performance parameter, determining if the potential anomaly in the in-use performance of the memory device is present with respect to the memory device.

32. A computer-implemented system for detecting a potential anomaly in a memory device, the system comprising a supervisory entity computer, the supervisory entity computer being communicatively coupled to the memory device, the memory device being a hard disk drive (HDD) for processing a plurality of I/O operations, the supervisory entity computer having a processor and a non-transient memory communicatively coupled to the processor, the non-transient memory storing instructions thereon which when executed by the processor cause the supervisory entity computer to, over a pre-determined period of time:
determine a subset of input/output (I/O) operations having been sent to the memory device for processing;
apply at least one counter to determine an actual activity time of the memory device during the pre-determined period of time, the actual activity time being an approximation value representative of time the memory device took to process at least a portion of the subset of I/O operations;
apply a pre-determined model to generate an estimate of a benchmark processing time for each one of the subset of I/O operations, the applying the pre-determined model comprising:
based on a size of the sequential one of the subset of I/O operations and a pre-determined speed of execution of a type of the sequential one of the subset of I/O operations, determining an execution time for the sequential one of the subset of I/O operations;

determining if execution of the sequential one of the subset of I/O operations requires a full-cycle re-positioning of a writing head of the memory device from a position where a previous one of the subset of I/O operations terminated being recorded; and if full-cycle re-positioning is required, adding to the execution time a pre-determined full-cycle re-positioning time to derive the benchmark processing time;

calculate a benchmark processing time for the subset of I/O operations;

generate a performance parameter based on the actual activity time and the benchmark processing time; and based on an analysis of the performance parameter, determine if the potential anomaly is present in the memory device.

33. A computer-implemented system for detecting a potential anomaly in each one of a plurality of memory devices, the system comprising a supervisory entity computer, the supervisory entity computer being communicatively coupled to the plurality of memory devices, at least one device of the plurality of memory devices being an SSD for processing a plurality of I/O operations, the SSD having at least one of a model number and a part number, the supervisory entity computer having a processor and a non-transient memory communicatively coupled to the processor, the non-transient memory storing instructions thereon which when executed by the processor cause the supervisory entity computer to, over a pre-determined period of time:

determine a subset of input/output (I/O) operations having been sent to the each one of the plurality of memory devices for processing;

apply at least one counter to determine an actual activity time of the each one of the plurality of memory devices during the pre-determined period of time, the actual activity time being an approximation value representative of time the each one of the plurality of memory devices took to process at least a portion of the subset of I/O operations, the at least one counter including a first counter for monitoring I/O operations sent to the SSD for processing, a second counter for monitoring confirmations of completed I/O operations received from the SSD, and in applying the at least one counter, the processor being configured to:

executing the first counter to monitor I/O operations sent to the SSD for processing during the pre-determined period of time, executing the second counter to monitor confirmations of completed I/O operations received from the SSD during the pre-determined period of time, and determining a total of all time periods within the pre-determined period of time during which a value of the first counter was equal to a value of the second counter;

apply a pre-determined model to generate an estimate of a benchmark processing time for each one of the subset of I/O operations;

calculate a benchmark processing time for the subset of I/O operations;

generate a performance parameter for each one of the plurality of memory devices based on:
(i) the actual activity time and the benchmark processing time;
(ii) an SSD minimum delay pre-determined for a benchmark SSD, the benchmark SSD having the at least one of the model number and the part number as the SSD; and based on an analysis of the performance parameter, determine if the potential anomaly is present in the each one of the plurality of memory devices.

* * * * *